United States Patent

Hasegawa et al.

[11] Patent Number: 5,917,620
[45] Date of Patent: *Jun. 29, 1999

[54] IMAGE READING APPARATUS

[75] Inventors: Shizuo Hasegawa, Urayasu; Noriyoshi Chizawa, Yokohama; Yasuhiro Takiyama, Kawasaki; Tadashi Takahashi, Yokohama, all of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/612,497

[22] Filed: Mar. 7, 1996

[30] Foreign Application Priority Data

Mar. 7, 1995 [JP] Japan ................................. 7-047228
Mar. 7, 1995 [JP] Japan ................................. 7-047229

[51] Int. Cl.⁶ .............................. H04N 1/04; H04N 1/40; H04N 5/225; G06K 9/20
[52] U.S. Cl. .......................... 358/513; 358/513; 358/514; 358/516; 358/468; 358/448; 382/317; 348/262
[58] Field of Search ..................... 358/513, 514, 358/516, 482, 483, 250, 208, 504, 406, 445, 446, 468, 448; 382/270, 273, 274, 317, 318, 321, 322, 323, 324; 348/262, 241, 223; 250/234, 235, 236

[56] References Cited

U.S. PATENT DOCUMENTS

| | | |
|---|---|---|
| 4,691,114 | 9/1987 | Hasegawa et al. . |
| 4,713,698 | 12/1987 | Takahashi et al. . |
| 4,750,048 | 6/1988 | Satoh et al. ............................. 358/514 |
| 4,786,971 | 11/1988 | Kaneko et al. . |
| 4,974,072 | 11/1990 | Hasegawa ............................. 358/514 |
| 5,361,145 | 11/1994 | Hasegawa . |
| 5,475,508 | 12/1995 | Maeshima et al. .................... 358/514 |

Primary Examiner—Edward L. Coles
Assistant Examiner—Twyler M. Lamb
Attorney, Agent, or Firm—Fitzpatrick, Cella, Harper & Scinto

[57] ABSTRACT

There is disclosed an image reading apparatus comprising plural line sensors for converting light from an object into image signals, charge transfer unit for transferring the image signals, converted by the line sensors, mutually among the line sensors, correction unit for correcting signal levels of the image signals and control unit for effecting control so as to vary a manner of correction by the correction unit, according to a direction of transfer of the image signals by the charge transfer means among the line sensors.

26 Claims, 19 Drawing Sheets

SPECTRAL ENERGY DISTRIBUTION

FORWARD READING

BACKWARD READING

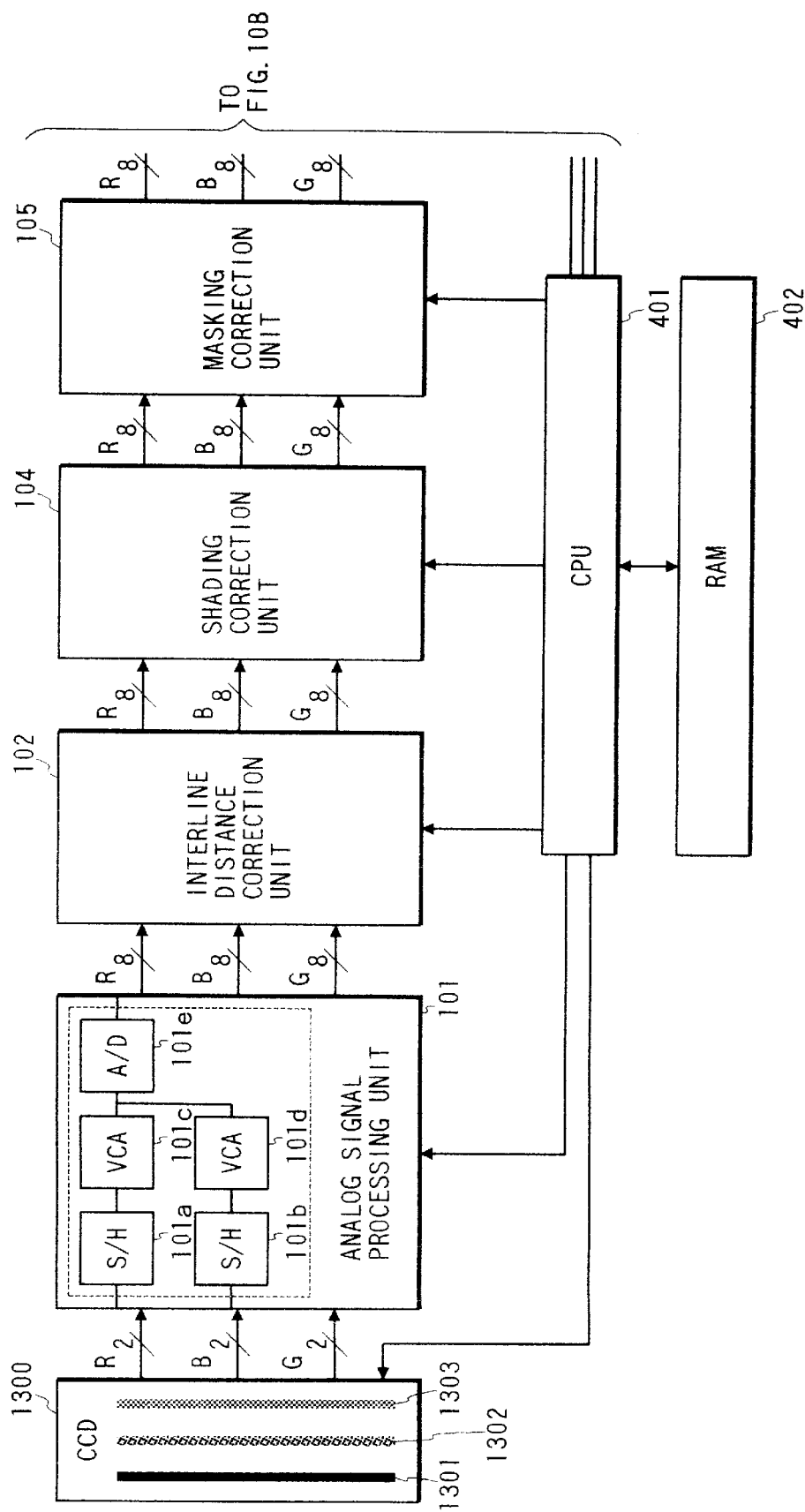

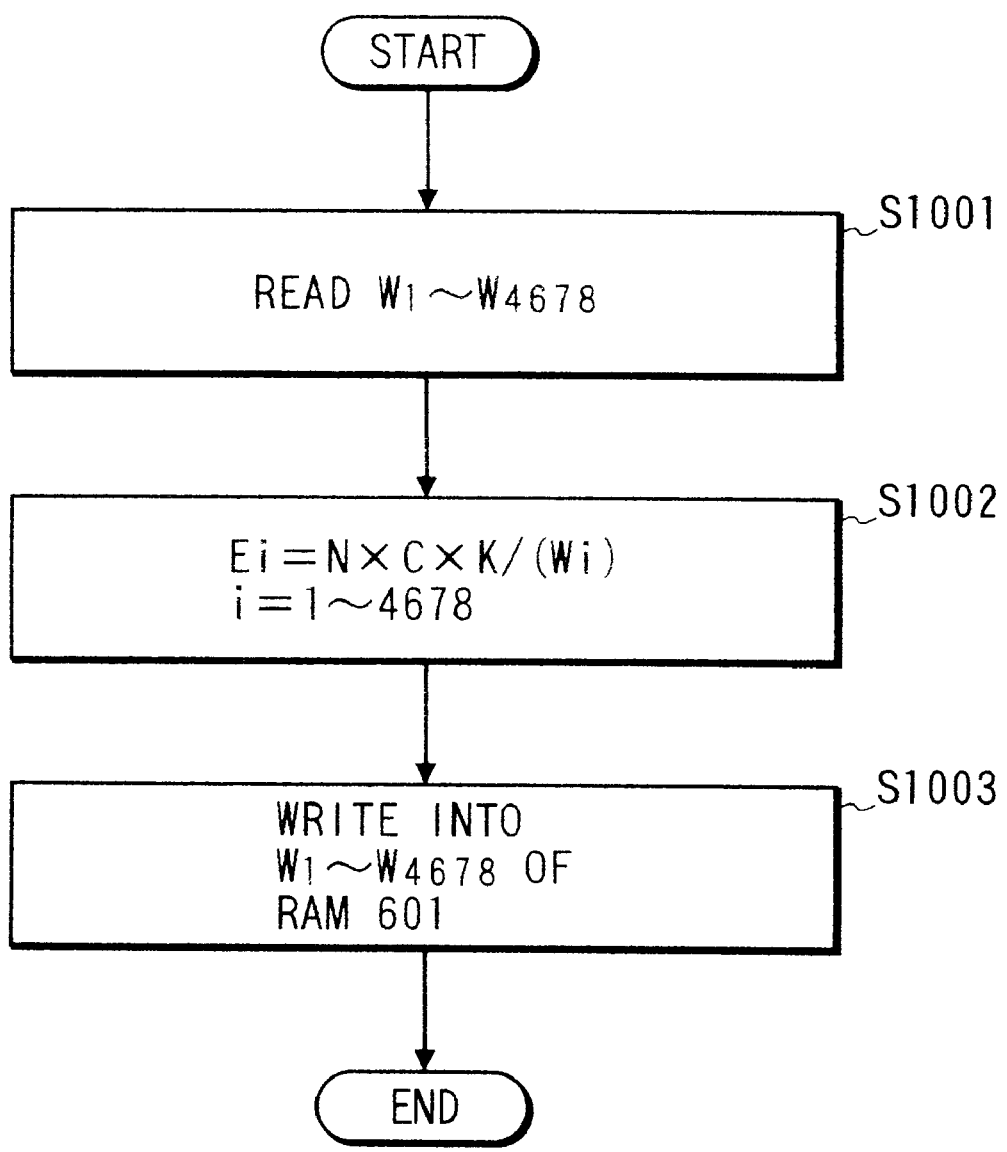

IMAGE READING APPARATUS

BACKGROUND OF THE INVENTION

1. Field of the Invention

The present invention relates to an image reading apparatus for reading an image with an image sensor and generating image signals.

2. Related Background Art

In the conventional image reading apparatus, there are already known various methods for full-color image reading, such as by (1) light source switching, (2) color separation with prisms, (3) filter switching and (4) on-chip color filters, among which the on-chip color filter method is considered best in attaining high-speed reading and precise color separation.

FIG. 1 shows an example of the configuration of a conventional color CCD linear image sensor with the on-chip color filter method.

This conventional color CCD linear image sensor 1601 is a three-line image sensor composed of three CCD (charge coupled device) image sensor chips 1602–1604 arranged in parallel manner on a wafer and provided respectively with R, G and B on-wafer color filters.

A light-receiving unit 161 effects photoelectric conversion according to the amount of incident light (number being given only for the R unit but G and B units are constructed similarly). On the CCD sensor elements of these light-receiving units 161, there are provided R, G and B on-wafer color separation filters. At an end of the light-receiving unit 161 an aluminum mask is provided on the light-receiving unit 161 to intercept the incident light, thereby forming a light-shielded pixel for constantly providing an output corresponding to a dark state. Transfer gates 162, 163 transfer the charges, accumulated in the light-receiving unit 161, to CCD shift registers 164, 165 in response to a shift gate pulse $\phi_{TG}$. The charges accumulated in the even-numbered pixels of the light-receiving unit 161 are transferred through the transfer gate 163 to the CCD shift register 165 for the even-numbered pixels, while those in the odd-numbered pixels of the light-receiving unit 161 are transferred through the transfer gate 162 to the CCD shift register 164 for the odd-numbered pixels.

The CCD shift registers 164, 165, for effecting CCD transfer (complete transfer) of the charges, transferred from the light-receiving unit 161, to output units, are two-phase driven by drive clock signals $\phi_1$ ($\phi_{1R}$, $\phi_{1FR}$, $\phi_{1G}$, $\phi_{1FG}$, $\phi_{1B}$, $\phi_{1FB}$ and $\phi_2$ ($\phi_{2R}$, $\phi_{2FR}$, $\phi_{2G}$, $\phi_{2FG}$, $\phi_{2B}$, $\phi_{2FB}$).

An output gate 166 serves to transfer the charges from the CCD shift registers 164, 165 respectively to output capacitors 167a, 167b which convert the transferred charges into voltages. Two-stage source follower amplifiers 168a, 168b serve to reduce the output impedance, thereby eliminating noise from the output signal.

The output capacitors 167a, 167b and the source follower amplifiers 168a, 168b constitute floating diffusion amplifiers (FDA).

There are also provided signal output terminals OSAR, OSBR, OSAG, OSBG, OSAB, OSBB; reset pulse terminals $\phi$RAR, $\phi$RBR, $\phi$RAG, $\phi$RBG, $\phi$RAB, $\phi$RBB; CCD shift register clock terminals $\phi$1R, $\phi$1G, $\phi$1B, $\phi$2R, $\phi$2G, $\phi$2B; transfer gate clock terminals $\phi$TGR, $\phi$TGG, $\phi$TGB; and source follower amplifier drain terminals ODR, ODG, ODB.

In the color image sensor 1601 of the above-explained configuration, the light falling onto the light-receiving unit 161 is converted into charges proportional to the amount of light. These charges in the even- and odd-numbered pixels are respectively transferred to the CCD shift registers 164, 165 in response to the shift gate pulse $\phi_{TG}$, then output bit by bit to the FDA through the output gate 166 according to the drive clock signals $\phi_1$, $\phi_2$, then converted into voltages by the output capacitors 167a, 167b of the FDA, and finally output through the two-stage source follower amplifiers 167a, 167b and the output terminals OSA, OSB.

However, the conventional configuration explained above shows overall spectral sensitivity characteristics as shown in FIG. 5, because of spectral transmittances of the R, G and B filters shown in FIG. 2, a spectral energy distribution of the light source shown in FIG. 3 and a spectral transmittance of an infrared absorbing filter shown in FIG. 4, whereby the amounts of charges generated in the photodiodes of the CCD's 1602, 1603, 1604 are in the order of B-CCD < R-CCD < G-CCD. Eventually the CCD's 1602, 1603, 1604 have the sensitivities increasing in the order of B-CCD < R-CCD < G-CCD, so that the sensitivities of the CCD's become, for example, 2.1 V/1x.sec for R, 2.6 V/1x.sec for G and 0.86 V/1x.sec for B.

The saturated output voltage is usually the same for the CCD's 1602, 1603 and 1604 because the CCD shift registers 164, 165 are of a same size.

In the actual use of such 3-line color CCD linear sensor, the structure of the image reading system is determined by the amount of light which gives an output voltage providing a necessary S/N ratio.

Stated differently, it is determined by the amount of light when the output voltage of the B-CCD 1604 of the lowest sensitivity provides the required S/N ratio. For example, for a required S/N ratio of 48 dB (256 levels) and a noise level of 1 mV from the CCD, the minimum output voltage becomes 256 mV.

Consequently, when the output voltage of the B-CCD is 256 mV, the output voltages of the R-CCD 1602 and the G-CCD 1603 respectively become:

2.1 (V/1x.sec)/0.86 (V/1x.sec)×256 mV<625 mV;

2.6 (V/1x.sec)/0.86 (V/1x.sec)×256 mV<774 mV.

Assuming that the above-mentioned output voltages are obtained for a certain accumulation time $T_1$ ($\mu$sec), there is required an accumulation time $T_2=T_1/2$ for doubling the reading speed of the image reading device. In such case the output voltages of the CCD's become 128 mV for B-CCD, 325 mV for R-CCD and 383 mV for G-CCD, so that the S/N ratio of 48 dB cannot be secured for the B-CCD 1604.

For compensating such drawback, the amount of light has to be doubled, but a mere doubling of the light amount cannot solve the problem for example because of the temperature rise in the device. For successful designing of the device, it is necessary to increase the amount of illuminating light to an extent that will not causing the temperature rise and to cover the deficiency by sacrificing the S/N ratio of the B-CCD. Consequently there inevitably results a deterioration in the image quality.

For this reason there is proposed a linear image sensor of so-called TDI (time delay and integration) system, of the configuration shown in FIG. 6. Such TDI linear image sensor is provided with photoelectric conversion means in plural lines, of which output signals are synthesized in succession, in synchronization with the reading speed of the scanner employing such line sensor, thereby providing an output signal of several times of that of each line of the photoelectric conversion means in the line sensor.

In FIG. 6, the color CCD linear sensor 1700 capable of the above-explained TDI operation is composed of red, blue and green CCD linear sensors 1701, 1702, 1703.

1704a–1704c indicate linear photodiode arrays with red on-chip color filters, and 1705a and 1705b indicate CCD shift registers for horizontally transferring the charges, generated in the photodiode arrays 1704a–1704c, to output units 1718a, 1718b. The two CCD shift registers 1705a, 1705b are used for increasing the reading speed of the color CCD linear image sensor.

Similarly, there are provided linear photodiode arrays 1706a–1706c, 1708a–1708c respectively provided with blue and green on-chip color filters; CCD shift registers 1707a, 1707b; 1709a, 1709b respectively for blue and green signals; and output units 1719a, 1719b; 1720a, 1720b respectively for the CCD shift registers for the blue and green signals.

There are also provided shift gates SH1 (1710), SH3 (1712) for temporarily accumulating the charges, generated in the linear photodiode arrays, in synchronization with the reading speed of the scanner, and shift gates SH2 (1711), SH4 (1713) for transferring the charges, accumulated in the shift gates SH1 (1710), SH3 (1712), therefrom to linear photodiode arrays 1704b, 1704c of the next stage, for synthesizing the charges generated therein.

A shift gate SH5 (1714) transfers the charges, generated in the linear photodiode array 1704c, to the CCD shift registers 1705a–1705d in synchronization with the reading speed of the scanner, and the charges transferred from the linear photodiode array 1704c through the shift gate SH5 (1714) are transferred, pixel by pixel, to the CCD shift registers 1705a, 1705b through the respectively corresponding pixel elements of shift gates SG1, SG2 (1715–1718).

Also a transfer gate TG1 (1717) is provided for charge transfer between the CCD shift registers 1705a and 1705b.

The CCD linear sensors 1702, 1703 for blue and green colors are constructed similarly to the CCD linear sensor 1701 for red color and will not, therefore, be explained further.

In the color CCD linear sensor 1700, as explained in the foregoing, the integration of the charges and the transfer of the charges between the photodiode arrays and the CCD shift registers or between the CCD shift registers are effected only in a direction indicated by arrows.

FIG. 7 is a view showing an example of the configuration of a scanner 1800 equipped with the color CCD linear sensor 1700 shown in FIG. 6.

The scanner 1800 is composed of a scanner main body 1800a and a document feeder 1800b.

There are also shown a platen glass 1810 for supporting an original, a halogen lamp 1805 for illuminating the original, and a first mirror 1802, the latter two constituting a mirror unit 1812.

A second mirror 1803 and a third mirror 1804 constitutes another mirror unit 1813.

A lens unit 1801 focuses, with size reduction, the light reflected from the original scanned by the halogen lamp 1805, onto the color CCD linear sensor 1700. A running-reading platen glass 1809 is provided for running reading of the originals with the document feeder 1800b.

In case of reading the original by placing it on the platen glass 1810 and moving the mirror units 1812, 1813 in a direction A (sub scanning direction) with a speed ratio of 2:1 by the stepping motor 1814, the mirror units 1812, 1813 start from the broken-lined positions.

The document scanner 1800b has the following structure.

There are provided an original input tray 1806, an original pickup roller 1807, an original feed rollers 1808, and an original discharge tray 1811.

The originals are stacked, with the top sides thereof facing upwards, on the input tray 1806. In case of one-side reading, the original is advanced by the pickup roller 1807 to the feed rollers, then fed by the feed rollers in the direction of a broken arrow according to the predetermined timing of original reading, and is subjected to running reading upon passing on the running-reading platen glass, whereby the reflected image is focused, in reduced size, onto the color CCD linear sensor 1700 through the mirror units 1812, 1813 and the lens unit 1801.

In case two-side reading of the original, the original is transported by the feed rollers in the direction indicated by solid-lined arrows, thus subjected to the reading of the top side in passing the reading position on the running-reading platen glass, then is inverted along a transport path for reading the bottom side in a movement opposite to that in the top side reading, and is discharged to the tray 1811 in a similar manner as in the case of one-side reading.

In such operation, the image focused on the color CCD linear sensor 1700 is scanned in a direction B or C respectively in the top side reading or in the bottom side reading. As the color CCD linear sensor 1700 shown in FIG. 5 can effect the TDI integration only in one direction, the image reading can be achieved only for the top side or the bottom side, depending on the mounting direction of the linear sensor 1700. For this reason there is further proposed a color CCD linear sensor 1300 as shown in FIG. 8, composed of CCD linear sensor units 1301, 1302, 1303 respectively for red, blue and green colors.

There are provided linear photodiode arrays 1301a–1301c, constituting photoelectric conversion means and provided with red on-chip color filters; and similar linear photodiode arrays 1303a–1303c, 1304a–1304c provided with blue and green on-chip color filters.

There are also provided CCD shift registers 1305a, 1305b; 1308a, 1308b for horizontally transferring the charges, generated in the linear photodiode arrays 1301a–1301c, to output units 109a, 109b; 130a, 130b, wherein the shift registers 1305a, 1305b are for forward (top side) reading (indicated by solid-lined arrow in FIG. 8), while those 1308a, 1308b are for backward (bottom side) reading (indicated by broken-lined arrow in FIG. 8).

The CCD shift registers 1305a, 1305b are also used for horizontally transferring the charges, generated in the arrays 1303a–1303c, to the output units 109a, 109b (for backward reading of the blue color).

CCD shift registers 1306a, 1306b are provided for transferring the charges, generated in the linear photodiode arrays 1303a–1303c for blue color, to output units 110a, 110b and are used for forward reading of blue color.

They are also used for outputting the charges generated in the linear photodiode arrays 1308a–1308b for green color (for backward reading of green color).

CCD shift registers 1307a–1307b are provided for horizontally transferring the charges, generated in the linear photodiode arrays 1304a–1304c for green color, to output units 111a, 111b.

Shift gates SH1 (112), SH2 (113), SH3 (114), constituting first charge transfer means, are provided for transferring the charges generated in the linear photodiode array 1301a, to the next linear photodiode array 1301b for synthesizing with the charges generated therein. In the forward reading, the shift gates SH1 (112), SH2 (113) and SH3 (114) are activated in succession to transfer the charges in the direction indicated by the solid-lined arrow, but, in the backward reading, they are activated in the reverse order, i.e. SH3 (114) → SH2 (113) → SH1 (112).

Also shift gates SH4–SH6 (115–117), constituting first charge transfer means, are provided for vertically transferring the charges in order to synthesize the charges generated in the linear photodiode arrays 1301b and 1301c, and they are activated in an order of SH4 → SH5 → SH6 or SH6 → SH5 → SH4 respectively in the forward or backward reading.

A shift gate SH7 (118) transfers the charges generated in the linear photodiode array 1301c to the horizontal CCD shift registers 1305a, 1305b in synchronization with the reading speed of the scanner. Switch gates SG1 (119), SG2 (120) transfer the charges of the linear photodiode array 1301c, transferred by the shift gate SH7 (118), pixel by pixel to the horizontal CCD shift registers 1305a, 1305b. The switch gate SG1 transfers the charges of the odd-numbered pixels to the shift register 1305b, and the switch gate SG2 transfers the charges of the even-numbered pixels to the shift register 1305a.

Transfer gates TG1–TG3 (121–123), constituting second charge transfer means, transfer charges between the horizontal CCD shift registers 1305a, 1305b. As in the above-explained charge transfer between the linear photodiode arrays, the direction of transfer can be switched by changing the order of functions of these transfer gates as TG1 → TG2 → TG3 or TG3 → TG2 → TG1 (solid-lined arrow indicating forward direction, and broken-lined arrow indicating backward direction).

The horizontal CCD shift registers 1305a, 1305b are of two-phase drive, and are composed of alternate connection of $\phi 1$ and $\phi 2$ registers as already known, and are adapted to transfer the charges in succession toward the output units (109a, 109b) by the change in the potential of the VVD register, through alternate pulse inputs to the two registers. In the above-explained charge transfer by the transfer gates TG1–TG3, there are only used the $\phi 1$ registers among the two registers.

A shift gate SH8 (124) transfers the charges of the linear photodiode array 1301a to the CCD shift registers 1308a, 1308b in synchronization with the reading speed of the scanner. Switch gates SG1 (125), SG2 (126) transfer the charges of the shift gate SH8 pixel by pixel to the CCD shift registers 1308a, 1308b. The switch gate SG1 transfers the charges of the odd-numbered pixels to the CCD shift register 1308a, while the switch gate SG2 transfers the charges of the even-numbered pixels to the CCD shift register 1308b.

Transfer gates TG1–TG3 (127–129) effect charge transfer between the CCD shift registers 1308a and 1308b in a manner similar to that explained before.

FIGS. 9A and 9B are timing charts showing the function of the color CCD linear image sensor 1300 shown in FIG. 8.

In case of forward reading shown in FIG. 9A, signals SH7, SG1 and SG2 are shifted to "H" at a timing $T_1$, whereby the charges of the linear photodiode array 1301c are transferred to the shift gates SG1 (119), SG2 (120). Then, at $T_2$, SG1 is shifted from "H" to "L" and $\phi 1$ is shifted from "L" to "H", whereby the charges of the shift gate SG1 (119) are transferred to the $\phi 1$ registers of the CCD shift register 1305a.

Then at $T_3$, $\phi 1$ is shifted from "H" to "L" and TG1 assumes "H", whereby the charges are transferred from the $\phi 1$ registers to the transfer gate TG1 (121).

Similarly, TG1 is shifted from "H" to "L" while TG2 is shifted from "L" to "H" at $T_4$, and TG2 is shifted from "H" to "L" while TG3 is shifted from "L" to "H" at $T_5$, whereby the charges are transferred in succession from the transfer gate TG1 (121) to TG2 (122) and then to TG3 (123).

Then, at a timing $T_6$, the switch gate SG2 (120) is shifted from "H" to "L" and $\phi 1$ is shifted again from "L" to "H", whereupon the gates of the switch gate SG2 (120) are transferred to the $\phi 1$ registers of the CCD shift register 1305a, and the transfer gate TG3 (120) is shifted from "H" to "L" whereby the charges thereof are transferred to the $\phi 1$ registers of the CCD shift register 1305b.

The transfer operation in the shift gates SH1–SH7 for the TDI operation is conducted, as illustrated, by a shift gate in each cycle, from SH1 to SH7, and the charges are transferred to the CCD shift registers 1305a, 1305b in the 7th cycle and are output.

In case of backward reading shown in FIG. 9B, the operations are similar to those in the forward reading except that the shift gate SH7 (118) is replaced by the shift gate SH8 (124), and that the timings of function of the shift gates SH1–SH6 (112–117) and of the transfer gate s TG1–TG3 (121–123) are inverted.

The foregoing explanation has been limited to the CCD linear image sensor unit 1301 for red color in the color CCD linear image sensor 100, but the functions of the CCD linear image sensor units 1302, 1303 for blue and green colors are similar and will not, therefore, be explained further. The signals thus obtained are output from a CPU not shown.

However, in such color CCD linear image sensor provided with plural linear sensor arrays for adding the output charges thereof in synchronization with the timing of signal reading thereby increasing the output signal by the number of the sensor arrays, and so constructed as to effect the charge integration in forward and backward directions and to commonly utilize the CCD shift registers and the output units between different colors for enabling image reading both in the forward and backward directions, the CCD output signal obtained from each output unit of the color CCD linear image sensor represents different colors in the forward and backward readings, with consequently different output levels.

SUMMARY OF THE INVENTION

An object of the present invention is to provide an image reading apparatus capable of high-quality image reading at a high speed.

Another object of the present invention is to provide an image reading apparatus capable of providing stable image signals.

The above-mentioned objects can be attained, according to an embodiment of the present invention, by an image reading apparatus comprising plural line sensors for converting light from an object into image signals; charge transfer means for mutually transferring the image signals, converted by the line sensors, among the plural line sensors; correction means for correcting signal levels of the image signals; and control means for varying a manner of correction by the correction means according to a direction of transfer of the image signals among the line sensors by the charge transfer means.

Also according to another embodiment, there is provided an image reading apparatus provided with, on a single wafer, a plurality of linear image sensors each of which includes plural line sensors for converting light from an object into image signals; plural shift registers for transferring the image signals; converted by the line sensors, to an output unit; and color filters formed on the line sensors and adapted for effecting color separation of the light from the object, the image reading apparatus comprising plural first charge transfer means provided between the plural line sensors for transferring the image signals from one of the line sensors to the next one thereby synthesizing the image signals output from said plural line sensors; plural second charge transfer means provided between said plural shift registers and adapted to transfer the charges among said plural shift registers; correction means for correcting signal levels of the image signals; and control means for switching a direction of transfer of the first and second charge transfer means by changing a timing of driving pulses for the first charge transfer means, and varying a manner of correction of the correction means according to the direction of transfer.

The above-mentioned configurations allows to effect appropriate signal level correction according to the direction of transfer of the image signals, thereby achieving high-quality image reading in stable manner and at a high speed.

BRIEF DESCRIPTION OF THE DRAWINGS

FIGS. 19 and 20 are flow charts showing the function of the embodiment of the present invention.

DESCRIPTION OF THE PREFERRED EMBODIMENTS

Figure 8:
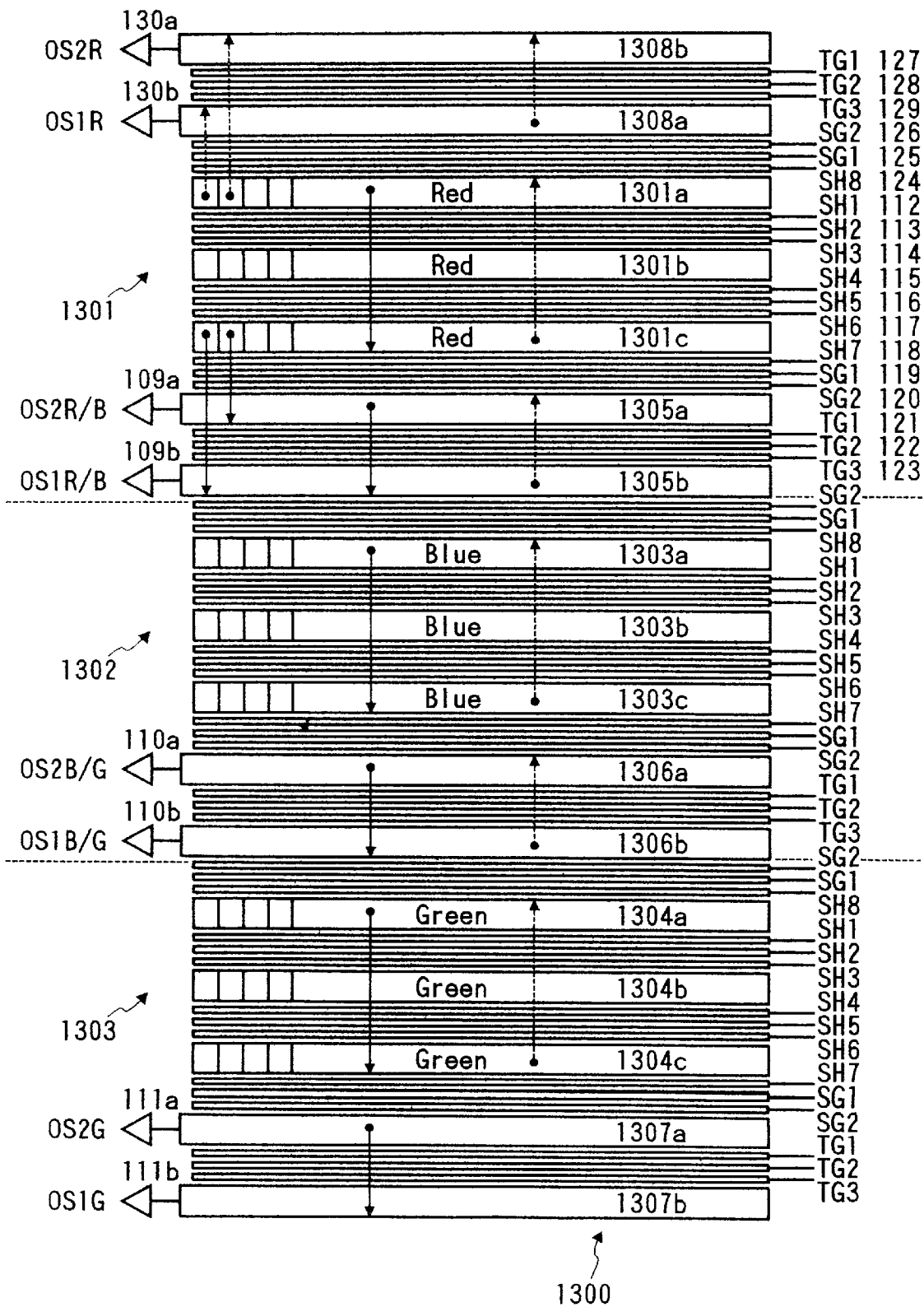
FIG. 8 is a view showing the configuration of a linear image sensor of TDI system capable of charge transfer in the forward and backward directions.
Figure 9A:
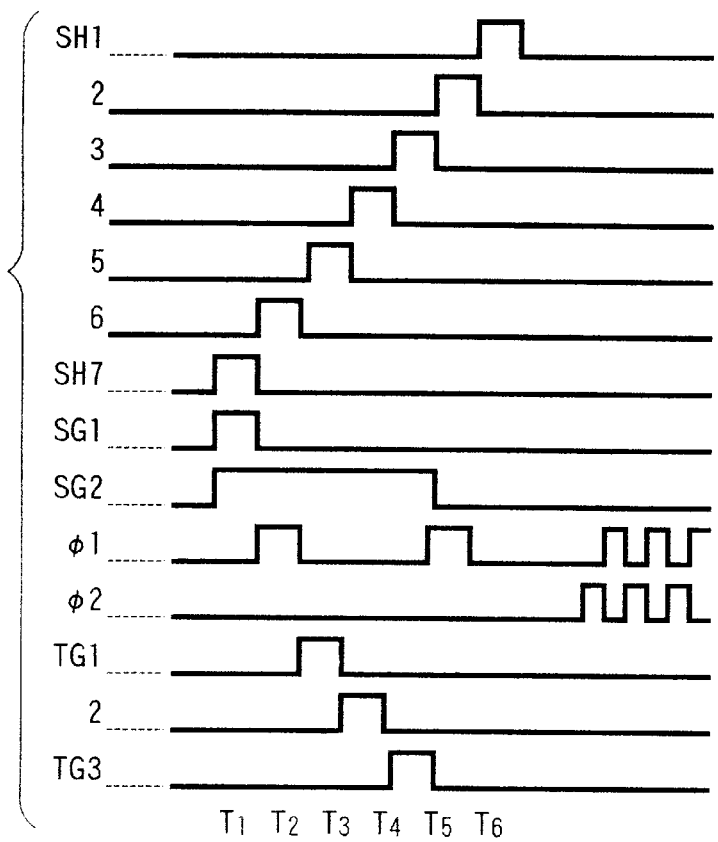
FIGS. 9A and 9B are timing charts of the linear image sensor of TDI system capable of charge transfer in the forward and backward directions.
Figure 9B:
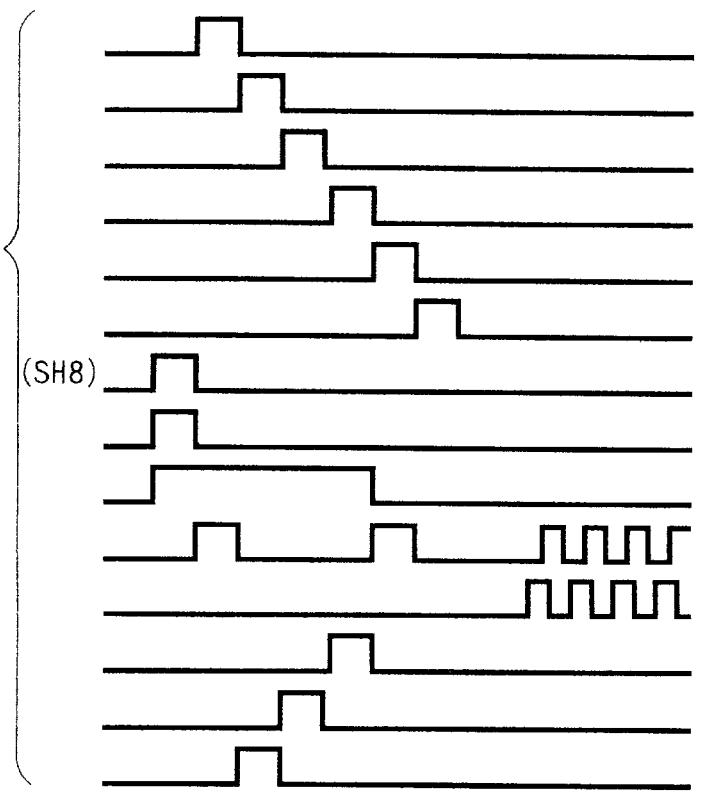
Figure 10B:
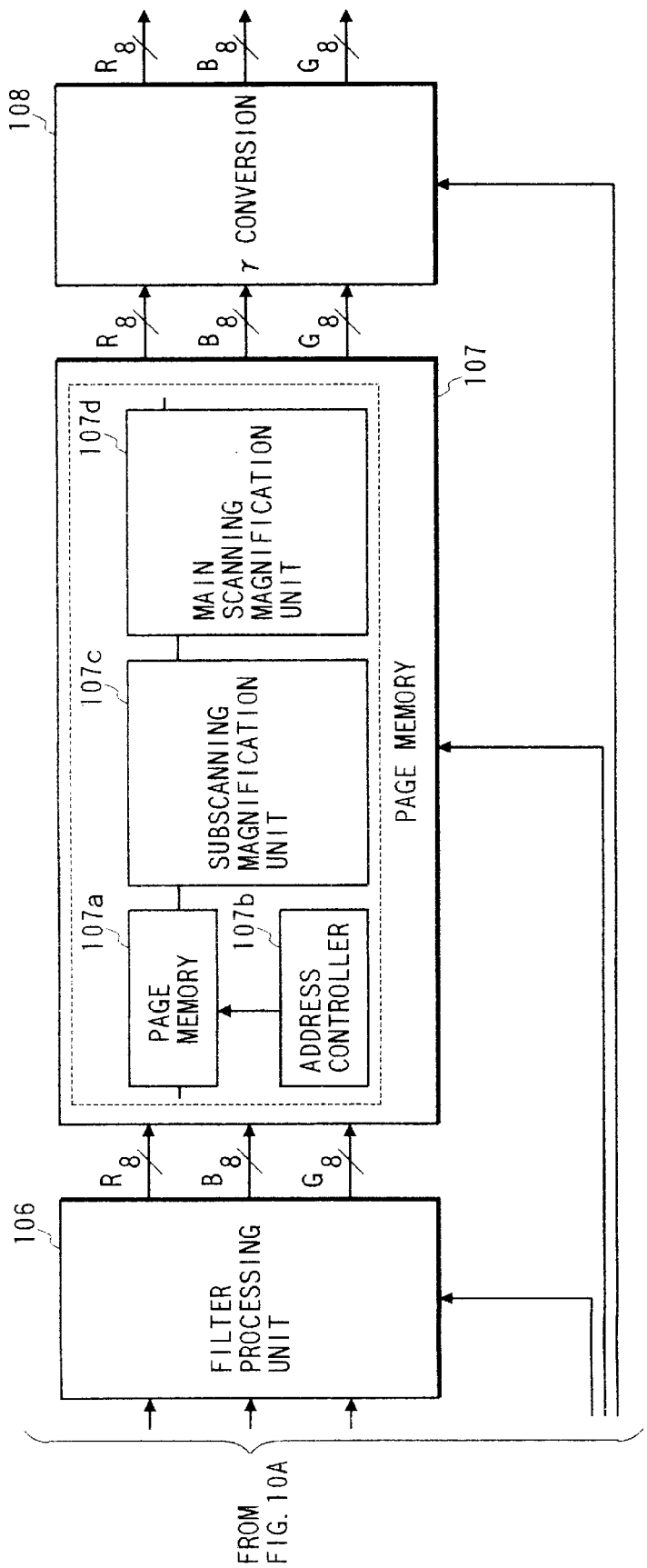
FIG. 10 is comprised of FIGS. 10A and 10B showing block diagrams of an image reading device embodying the present invention.

FIGS. 10A and 10B show the configurations of an image reading apparatus of an embodiment of the present invention. A color CCD linear image sensor 1300 of TDI system has the structure already explained in relation to FIG. 8, and is provided with CCD linear sensor units 1301, 1302, 1303 respectively for red, blue and green colors, each providing output signals of two lines. An analog signal process unit 101 is composed of sample-hold (S/H) circuits 101a, 101b for respectively holding the samples of the two CCD output signals, voltage-controlled amplifiers (VCA) 101c, 101d for amplifying the CCD output signals, retained by the S/H circuits 101a, 101b to a desired level, and an A/D converter 101e for multiplexing the signals amplified to the desired level by the VCA's 101c, 101d and then effecting A/D conversion to an 8-bit signal. There is provided one such unit for each color, but the unit for red color alone is illustrated. An interline distance correction unit 102 effects correction for the distances of 24 CCD linear sensors of different colors, provided mutually distant on a wafer in the color CCD linear sensor of the present embodiment.

Figure 11:
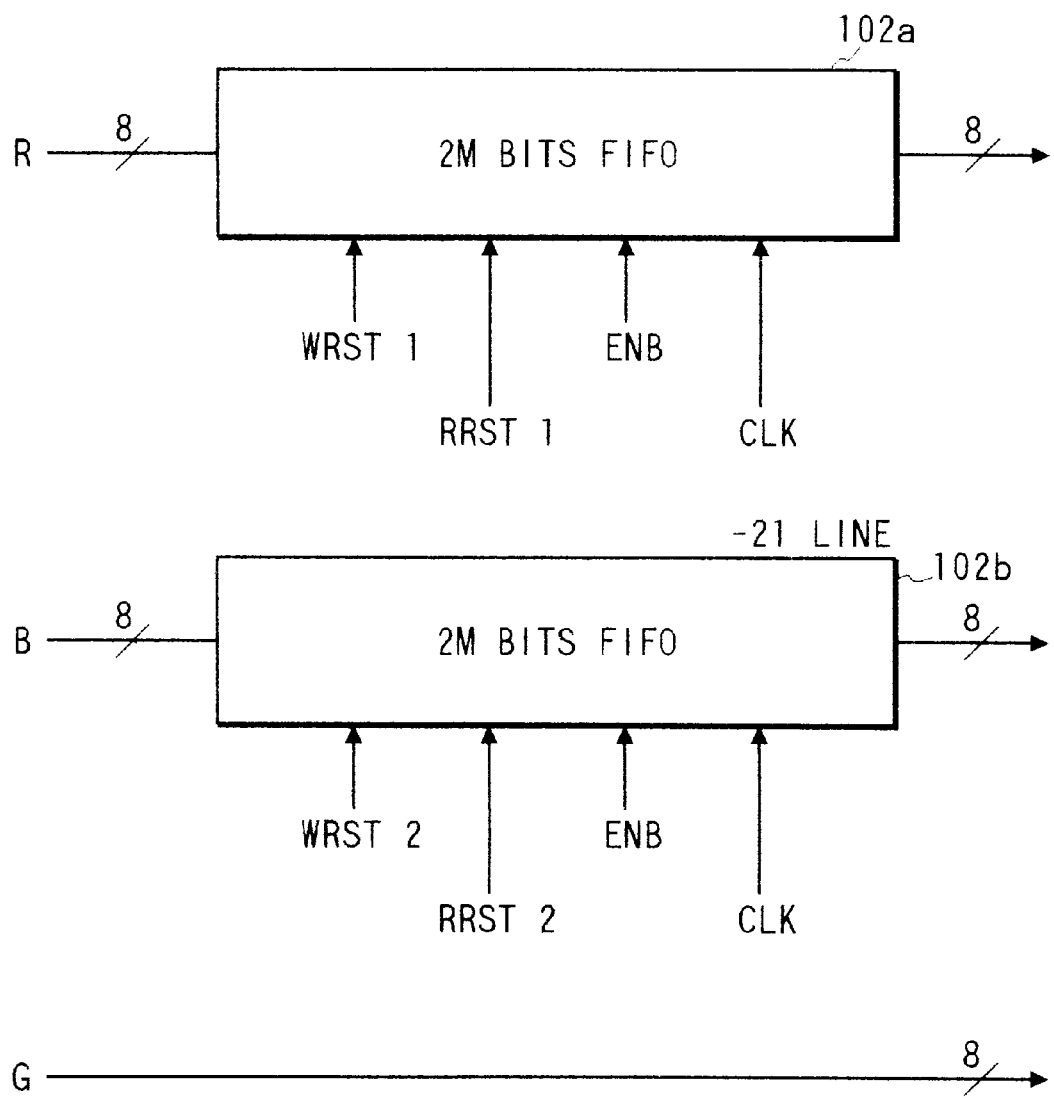
FIG. 11 is a block diagram of an interline distance correction unit in the embodiment of the present invention.

FIG. 11 is a detailed circuit diagram of the interline distance correction unit 102, composed of 2-Mbit FIFO's 102a, 102b provided as interline correction memories for R and B colors. The FIFO is not provided for G color, since the G signal is used as the reference, whereas the R and B signals read previously are delayed by the interline distances (24×2=48 lines for R and 24 lines for B). The two FIFO's 102a, 102b are controlled by reset signals WRST1, WRST2 for the reset counter for FIFO writing, a write/read enable signal ENB, and a write-read clock CK (not shown in FIG. 12).

Figure 12:
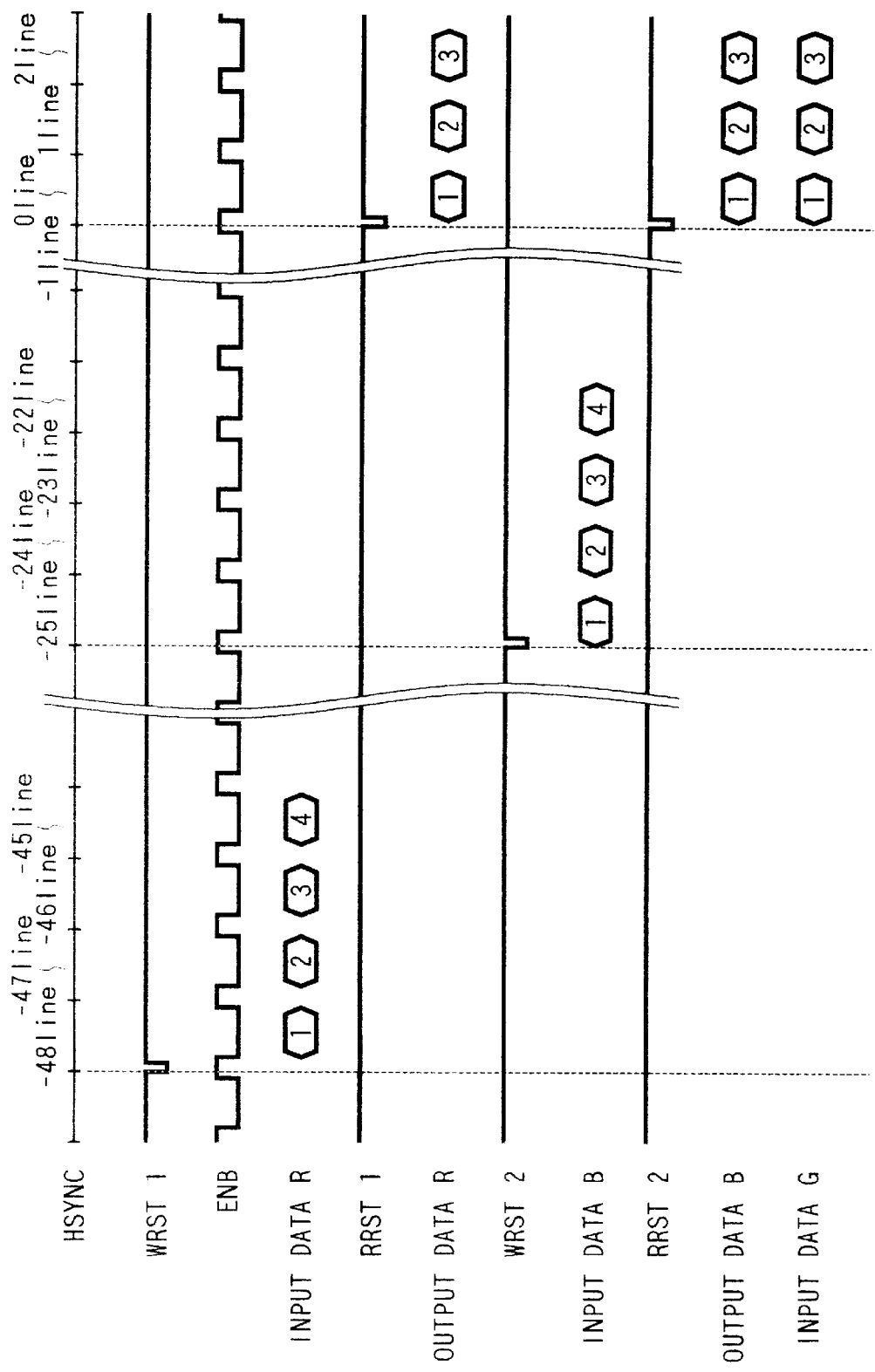
FIG. 12 is a timing chart of interline distance correction in the embodiment of the present invention.

These control signals are shown in a timing chart in FIG. 12. The R and B signals are read out, after respective delays by 48 and 24 lines, in synchronization with the input of the G signal. A shading correction unit 104 receives the signals after the interline distance correction by the interline distance correction unit 102 to a state equivalent to the signals obtained in a same position. The shading correction unit 104 effects correction of fluctuation of the black level signal (output level without the incident light) to a level 00H by the offset elimination, and correction of shading (light amount fluctuation in the main scanning direction of the optical system and fluctuation in the outputs of the pixels of CCD) in the white level in reading a standard white board, by normalization to FFH level.

The R, G and B signals subjected to the shading correction are then supplied to a masking correction unit 105.

The masking correction is to transform the overall spectral characteristics, determined by the R, G, B spectral sensitivity of the CCD and the spectral energy distribution of the light source, into standardized R, G, B spectral characteristics (for example NTSC R, G, B characteristics), by the following matrix calculation:

$$\begin{pmatrix} R_0 \\ G_0 \\ B_0 \end{pmatrix} = \begin{pmatrix} a11 & a12 & a13 \\ a21 & a22 & a23 \\ a31 & a32 & a33 \end{pmatrix} \begin{pmatrix} R_i \\ G_i \\ B_i \end{pmatrix}$$

wherein $R_i$, $B_i$, $G_i$ are input R, G, B signals; $R_0$, $G_0$, $B_0$ are masking-corrected R, G, B signals; and a11—a33 are masking coefficients.

The R, G, B signals corrected in the masking correction unit 105 are adjusted in image quality by image sharpening and smoothing in a filter process unit 106.

For example, the sharpening can be achieved with a Laplacian filter of a 3×3, 5×5 or 7×7 matrix depending on the desired level, and the smoothing can be achieved with a Median filter of a 3×3, 5×5, 7×7 matrix depending on the desired level.

The color signals subjected to a magnification change in a page memory 107 are supplied to a gamma conversion unit 108, for effecting gamma correction corresponding to the intended output. The gamma correction unit 108 is provided with look-up tables (LUT) corresponding to the number of conversions for gamma correction. In the present embodiment there are provided 8 tables of 256 bytes each. Consequently the gamma correction unit 108 is composed of 3 RAM's of 2k bytes.

The color signals adjusted in the filter process unit 106 are supplied to a page memory unit 107.

The page memory unit 107 is provided, for each color, with a page memory 107a with a maximum memory size of 66.3 Mbytes (A3 size), controlled by an address controller 107b.

The page memory unit 107 is further provided with a sub scanning magnification unit 107c for varying the magnification, in the sub scanning direction, of the image signal read from the page memory 107a according to the address controller 107b, and a main scanning magnification unit 107d for varying the magnification in the main scanning direction. These units are provided for each color, but those for red color alone are illustrated.

The sub scanning magnification unit 107c effects interpolation with input data of 8 lines, while the main scanning magnification unit effects interpolation on peripheral 8 pixels on a same line, thereby achieving a variation in the magnification, in the main and sub scanning directions, from 80% at maximum to 25% at minimum, in a step of 1%.

Figure 1:
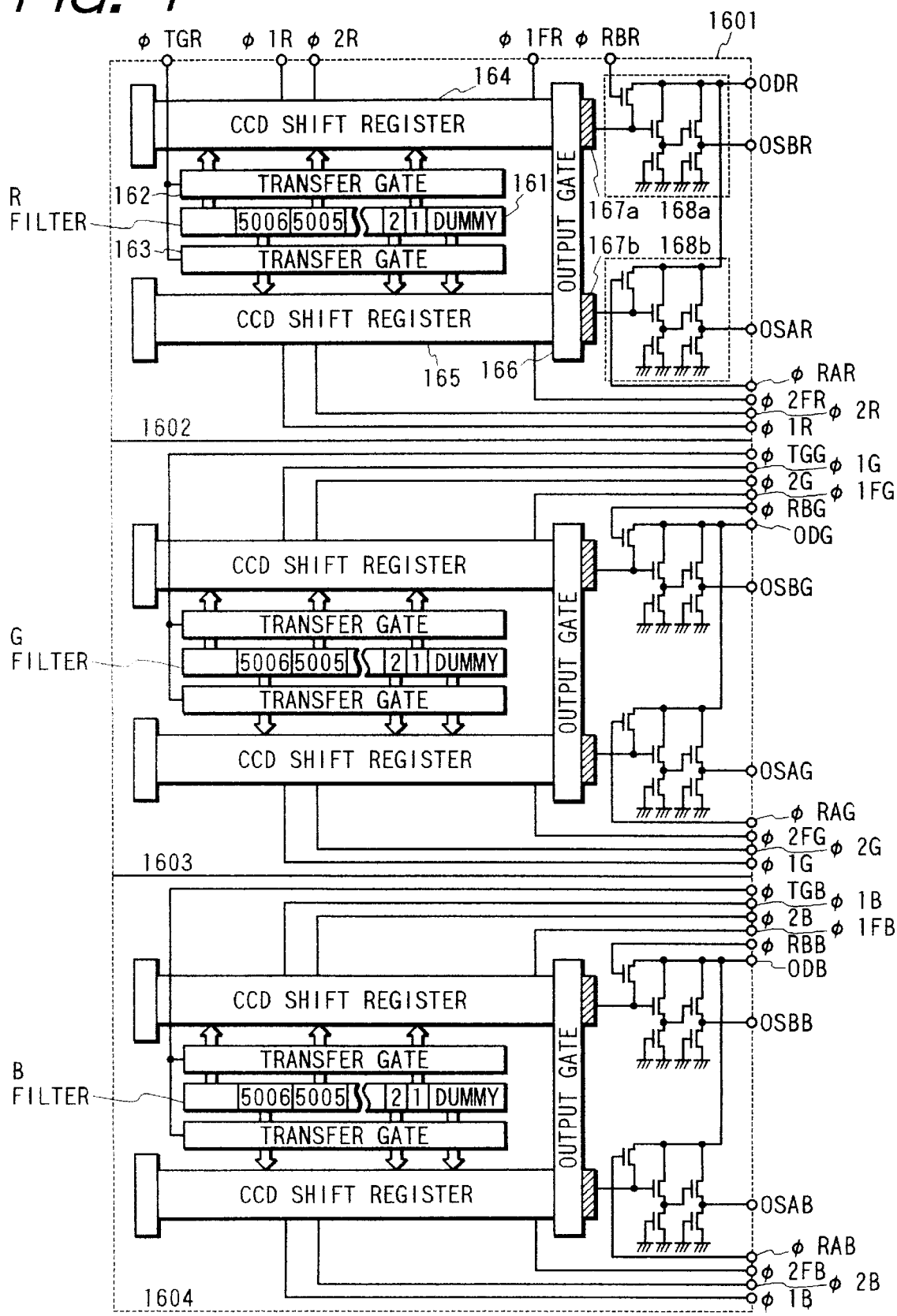
FIG. 1 is a view showing the configuration of a conventional linear image sensor.
Figure 2:
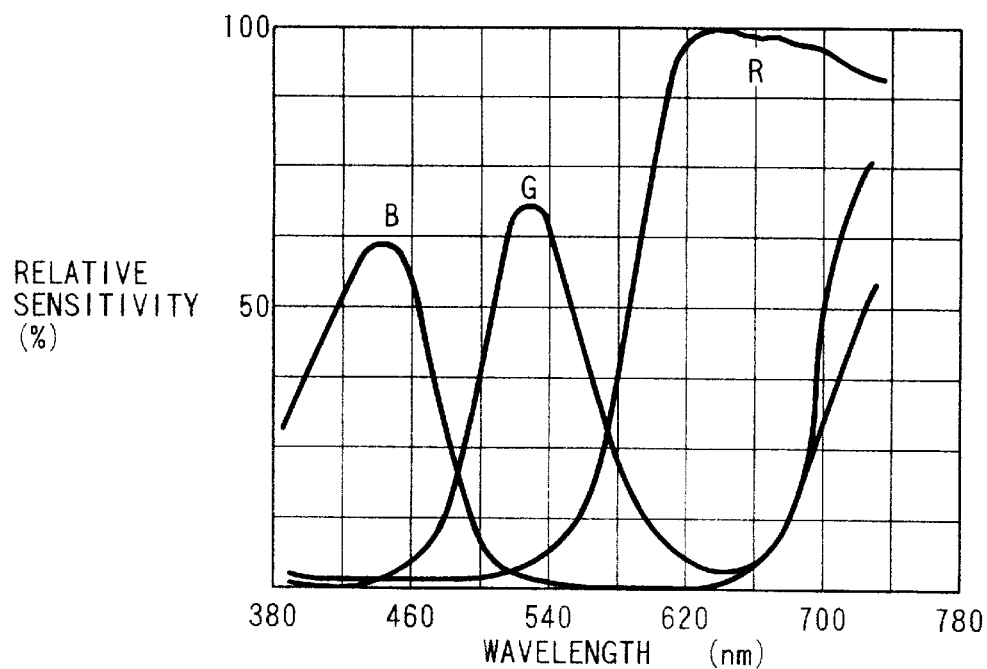
FIG. 2 is a chart showing the spectral transmittance of color filters.
Figure 3:
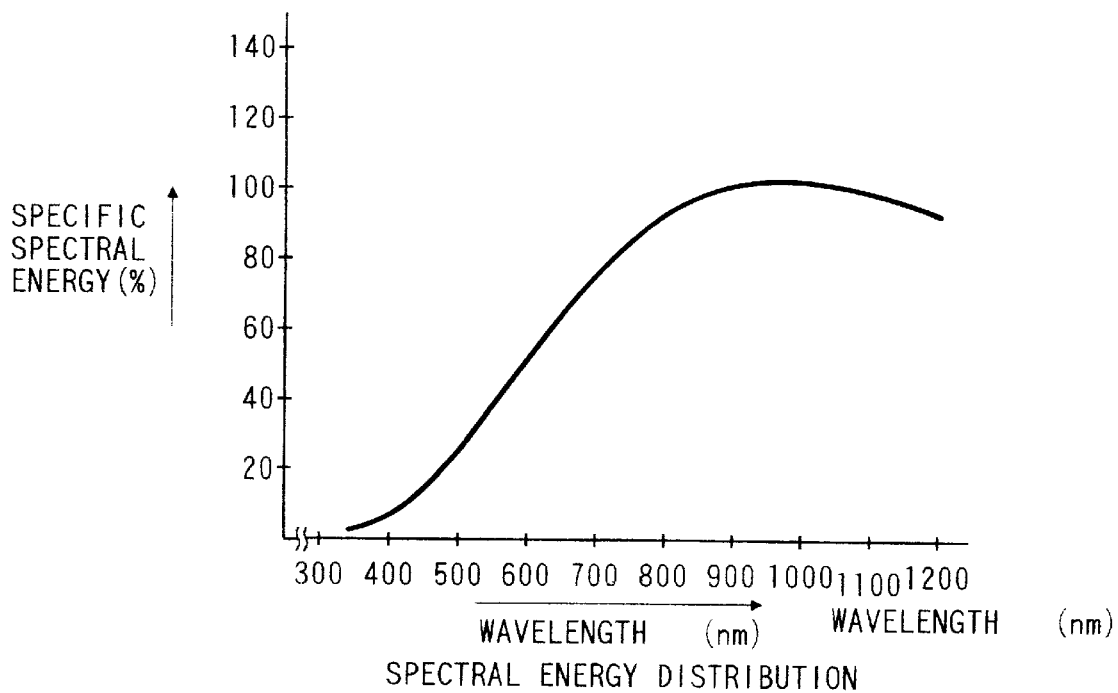
FIG. 3 is a chart showing the spectral energy distribution of a light source.
Figure 4:
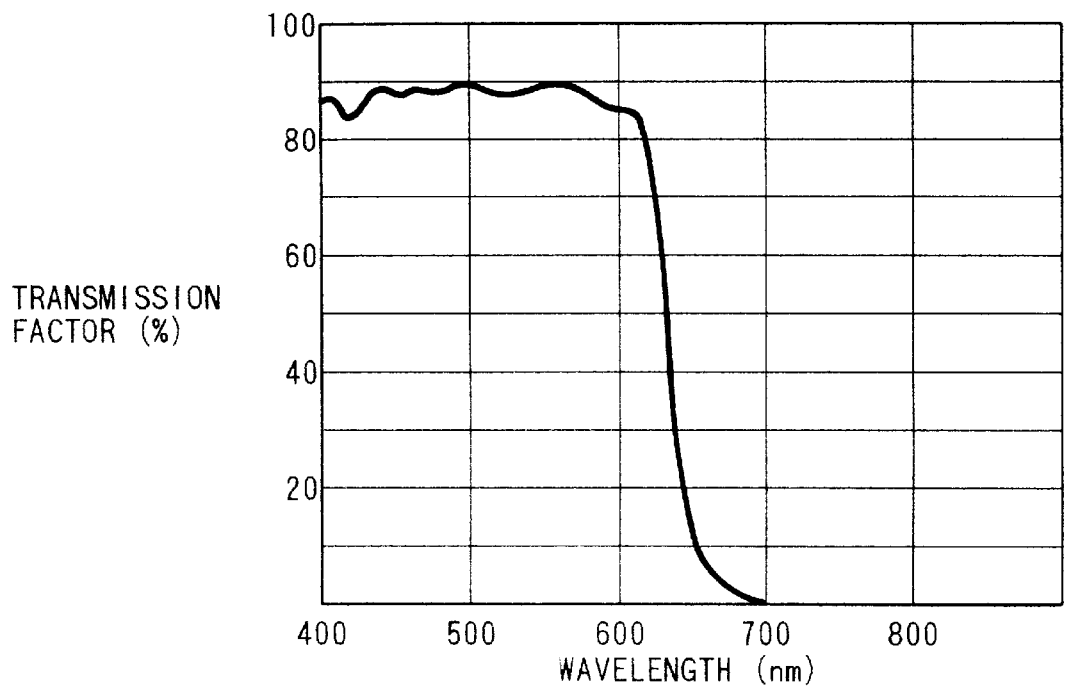
FIG. 4 is a chart showing the spectral transmittance of an infrared absorbing filter.
Figure 5:
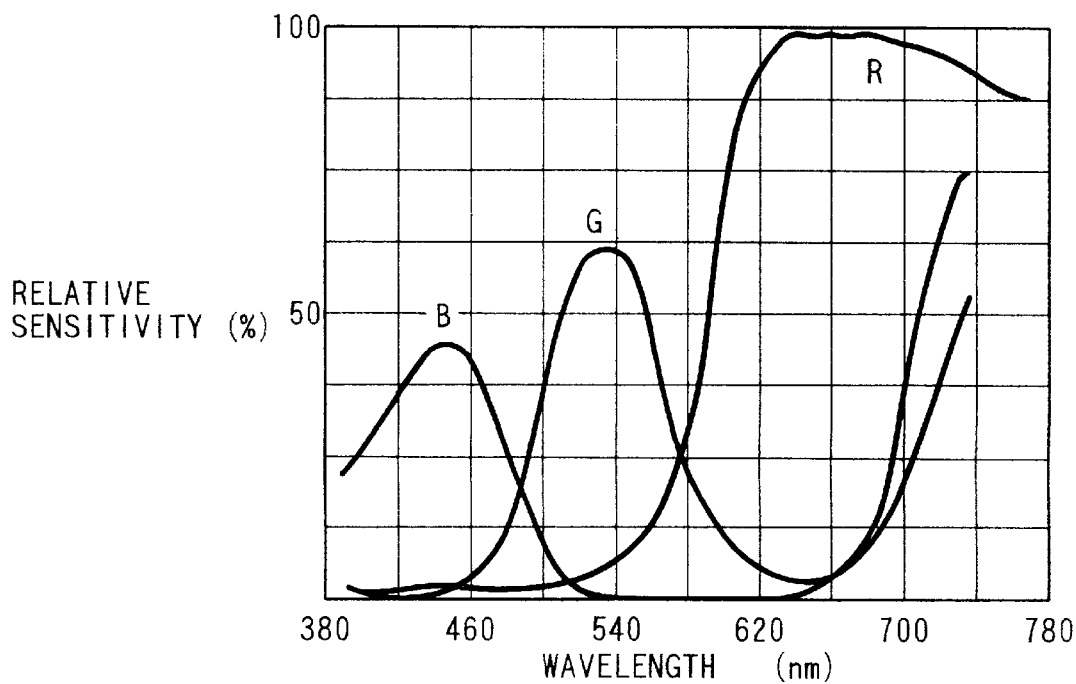
FIG. 5 is a chart showing the spectral characteristics of a conventional linear image sensor.
Figure 6:
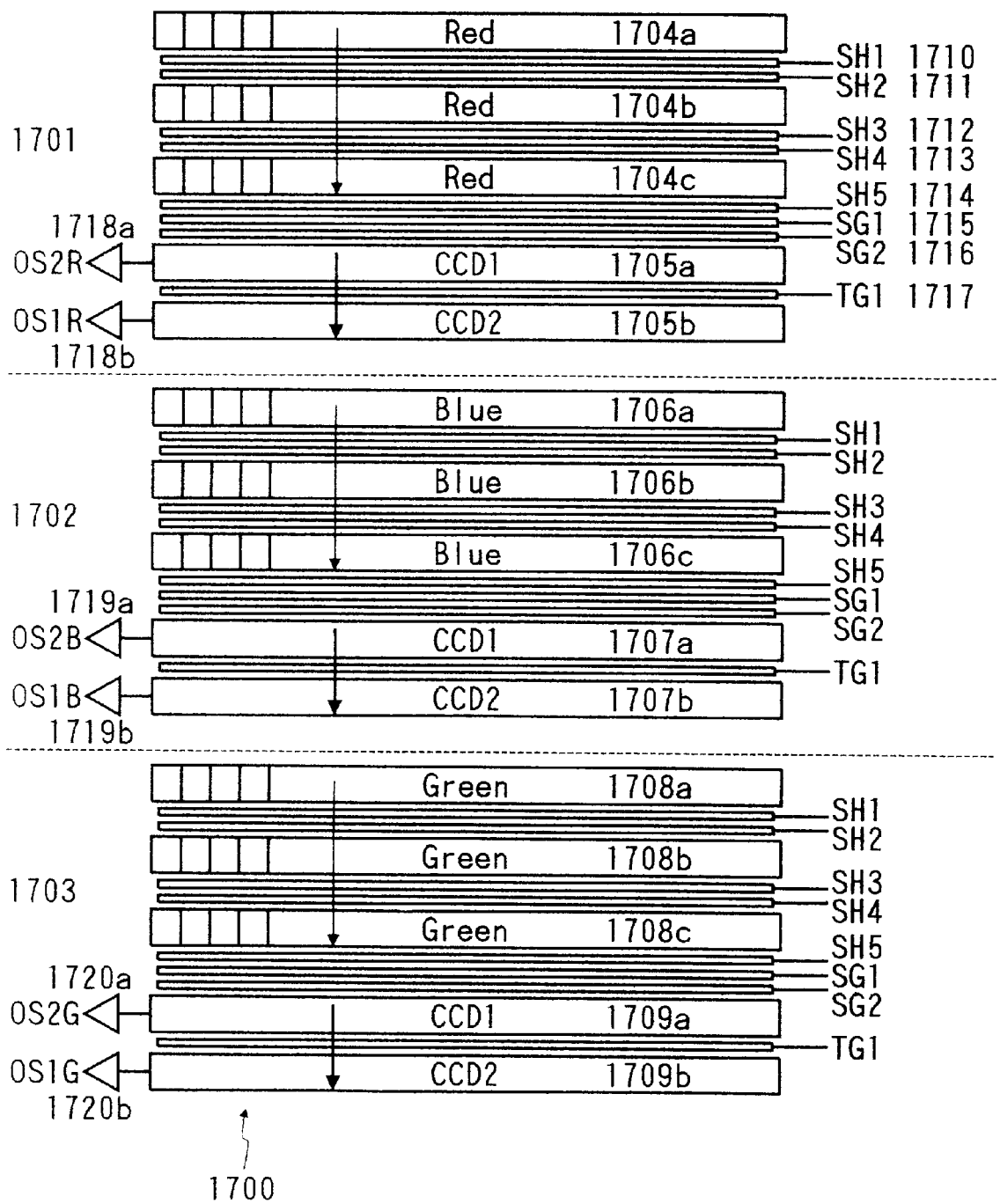
FIG. 6 is a view showing the configuration of a linear image sensor of TDI system.
Figure 7:
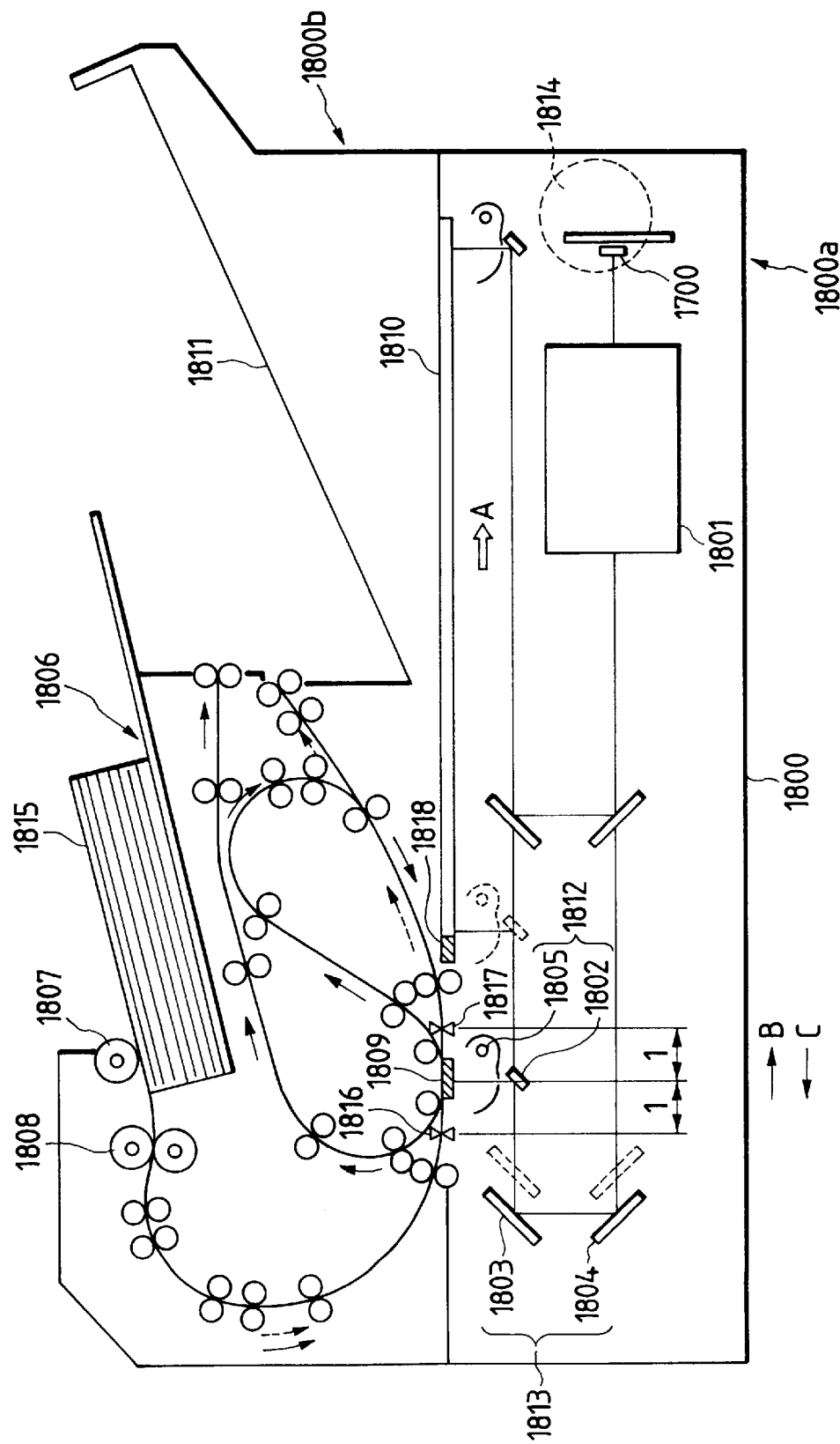
FIG. 7 is a view showing the configuration of an image reading device employing the linear image sensor of TDI system.
Figure 13:
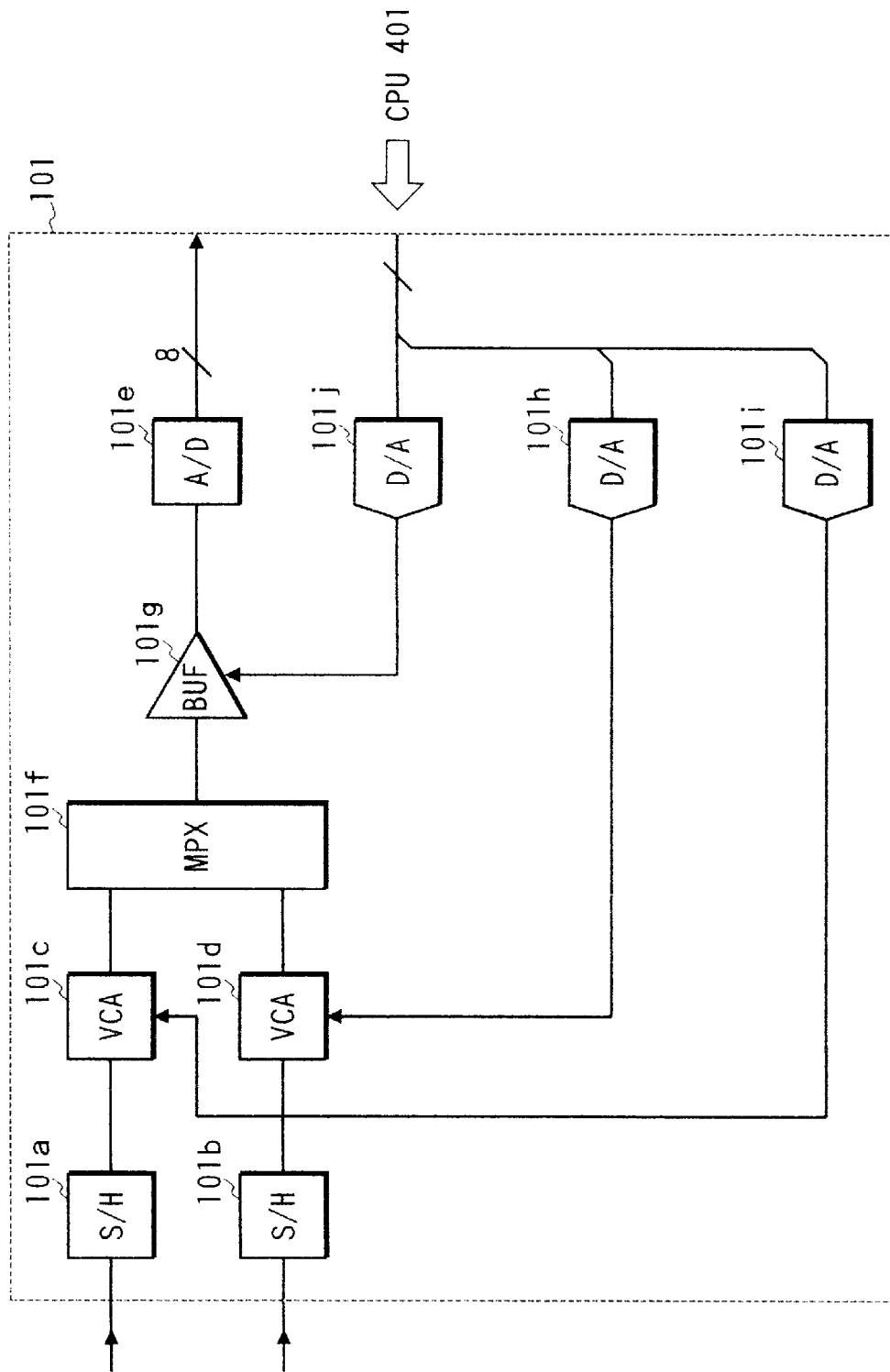
FIGS. 13 and 14 are block diagrams of an analog signal process unit in the embodiment of the present invention.

In the following there will be given a detailed explanation on the analog process unit 101, of which detailed structure is shown in FIG. 13, wherein components same as those in FIG. 1 are represented by same numbers. The two CCD output signals are respectively subjected to sample holding in the S/H circuits 101a, 101b, whereby the variations alone of the CCD signals are separated. Such variations of the CCD signals, held in the S/H circuits 101a, 101b are supplied to the VCA 101c, 101d which amplify the CCD output signals to a desired level, for supply to a multiplexer 101f. The gains of the VCA's 101c, 101d can be varied by the output voltage levels of D/A converters 101h, 101i according to data set by the CPU 401 constituting control means.

The multiplexer 101f multiplexes the two CCD output signals alternately corresponding to the pixel arrangement of the CCD linear sensor, thereby providing a single CCD output signal.

The output signal of the multiplexer 101f is, prior to entering an A/D converter 101e, supplied to a buffer amplifier (BUF) 101g, which generates a low-impedance output signal for the A/D converter 101e, with an adjustment of the offset level of the CCD output signal so as to match the dynamic range of the A/D converter 101e, according to an output voltage level of a D/A converter 101j.

Like the D/A converters 101h and 101i, the D/A converter 101j generates an output voltage level determined by the data set by the CPU 401, thereby varying the offset level of the buffer amplifier 101g.

The details of the BUF 101g will not be explained further. The A/D converter 101e converts the CCD output signal into an 8-bit digital signal, for supply to the next interline distance correction unit 102. In the color CCD linear image sensor 1300, the following CCD registers and output units are used for reaching the charges of the R, G, B, CCD linear sensor units 1301, 1302, 1303.

In the forward reading:
For R-CCD linear sensor 1301:
    CCD register 1305, output unit 109;
For G-CCD linear sensor 1302:
    CCD register 1306, output unit 110;
For B-CCD linear sensor 1303:
    CCD register 1307, output unit 111.
In the backward reading:
For R-CCD linear sensor 1301:
    CCD register 1308, output unit 130;
For G-CCD linear sensor 1302:
    CCD register 1305, output unit 109;
For B-CCD linear sensor 1303:
    CCD register 1306, output unit 110.

Consequently the analog signal process unit 101 connected to each output unit receives the output signals of the CCD linear sensors of different colors in the forward and backward readings. Therefore the setting data for the D/A converters 101h, 101i, 101j for setting the gain and the offset level of the VCA, BUF in the analog signal process unit 101 are preferably made different for the forward reading and the backward reading.

Consequently, in the present embodiment, the D/A converters 101h, 101i, 101j are given two sets of data A1/A2, B1/B2, C1/C2 which are switched according to the direction of reading. A1, B1 and C1 are setting data for the forward reading, while A2, B2 and C2 are setting data for the backward reading. These data are stored in a back-up RAM 402 employed with the CPU 401, and are supplied to the D/A converters 101h, 101i, 101j at the start of power supply in the image reading device and at the image reading operation, through the CPU 401.

As explained in the foregoing, the present embodiment effects appropriate correction of the output signal level, regardless of the image reading direction or the charge integrating direction, thereby providing a stable output signal.

Figure 14:
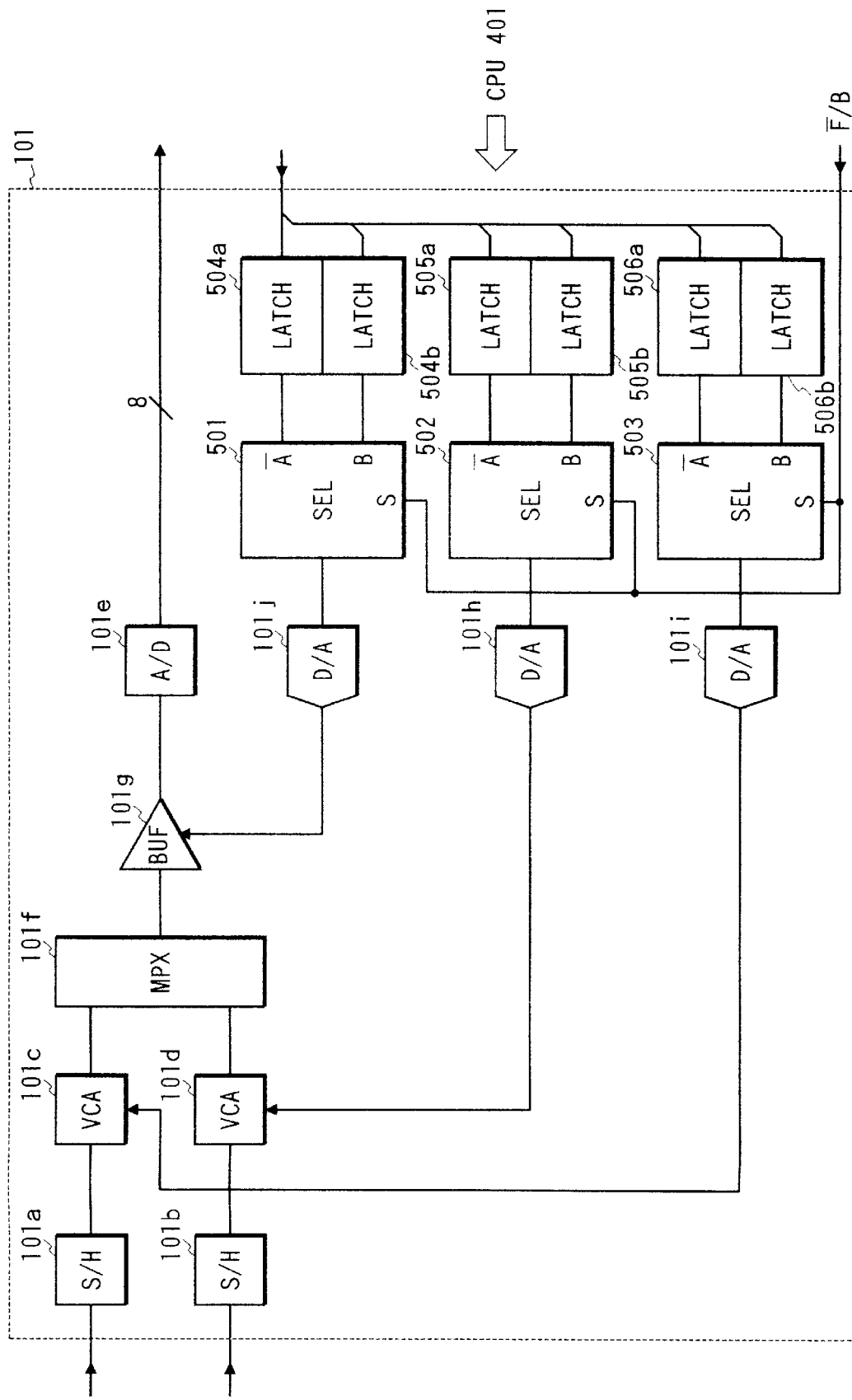

FIG. 14 shows another embodiment of the analog signal process unit 101, constituting an improvement over the configuration shown in FIG. 13 which requires a certain time for data resetting at the switching between forward and backward reading. Components same as those in FIG. 13 are represented by same numbers and will not be explained further.

In FIG. 14, latch circuits 504a, 504b, 505a, 505b, 506a, 506b temporarily latch the setting data A1/A2, B1/B2, C1/C2 for the D/A converters 101h, 101i, 101j, supplied from the back-up RAM 402. Selectors 501, 502, 503 select the data in the latches 504a, 505a, 506a or those in the latches 504b, 505b, 506b respectively in case an F/B signal from the CPU 401 is "L" indicating the forward reading or "H" indicating the backward reading, and thus selected data are supplied to the D/A converters 101h, 101i, 101j for setting the gain and the offset level of VCA, BUF matching the CCD output signal in the forward or backward reading.

In the present configuration, all the data A1/A2, B1/B2, C1/C2 for the D/A converters 101h, 101i, 101j are set at the start of power supply and are suitably supplied to these D/A converters merely by the F/B signal for switching the selectors 501, 502, 503, so that the time required for data setting at the switching of forward and backward reading can be significantly reduced in comparison with the example shown in FIG. 13.

In the following there will be given a detailed explanation on the shading correction unit 104.

Figure 15:
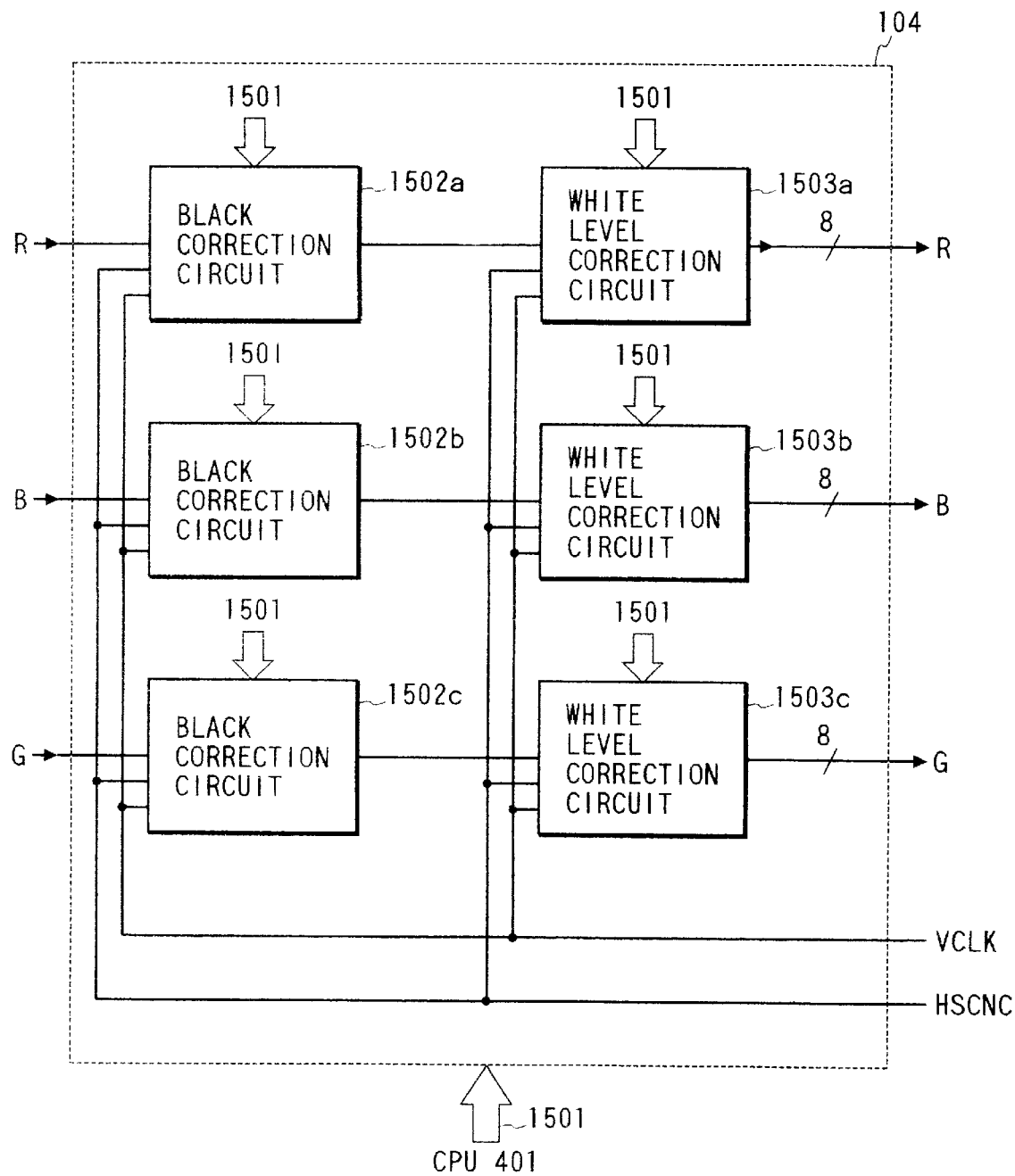
FIG. 15 is a block diagram of a shading correction unit in the embodiment of the present invention.

The shading correction unit 104 in FIG. 10A is composed, as shown in FIG. 15, of black correction circuits 1502a, 1502b, 1502c, and white level correction circuits 1503a, 1503b, 1503c.

Figure 16:
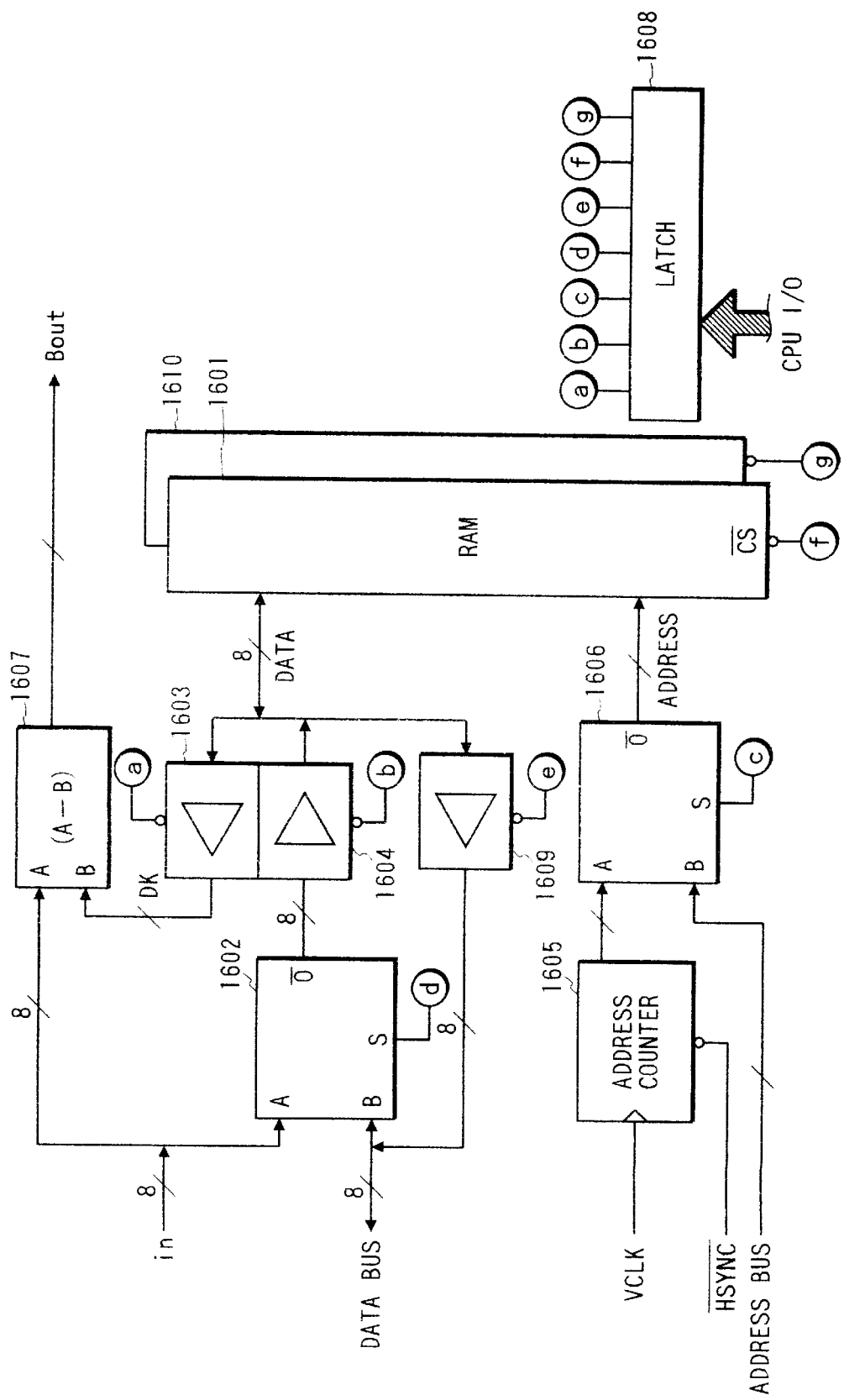
FIG. 16 is a block diagram of a black correction circuit in the embodiment of the present invention.

FIG. 16 shows the configuration of the black correction circuit 1502a, which is identical with 1502b or 1502c. The black level output of the CCD sensor, corresponding to a very low incident light, shows considerable fluctuation among the pixels, and, if such black level is for example printed without correction, there will result streaks or unevenness in the data portion of the image. For this reason the circuit shown in FIG. 16 corrects such fluctuation in such black level.

At first a forward reading mode is set (direction indicated by solid-lined arrow in FIG. 8), and the output signal of the R-linear image sensor 1301 is supplied to the black correction circuit 1502a.

More specifically, prior to a copying operation, the output signals of the CCD sensors 1301, 1302, 1303, obtained without turning on the halogen lamp 1805, are supplied as black level image signals to the abovementioned circuit. For storing a line of the black level image signal received from a $B_{in}$ terminal in a black level RAM 1601, the CPU 401 sets data in a latch 1608, selects terminal A of a selector 1602, also closes a gate 1603 and opens a gate 1604. Consequently the black level image signal enters the RAM 1601 through the selector 1602 and the gate 1604.

The CPU 401 also selects a port CS of the RAM 1601.

Also a port A of a selector 1606 is selected to enter a count output of an address counter 1605, initialized by an inverted HSYNC signal, into the address input port of the RAM 1601, and the black level image signal of a line, from the gate 1605 is stored in the RAM 1601 according to the addresses from the address counter 1605. (The above-explained operations are called black reference fetching mode, and the black level image signal stored in the RAM 1601 is called black level data.)

However, the black level data thus fetched in the RAM 1601, being of a very low level, are easily affected by the noises generated in the CCD sensor 1301 and in the analog signal process unit 101, and may therefore generate noises in the dark area of the image if used as black correction data.

Figure 17:
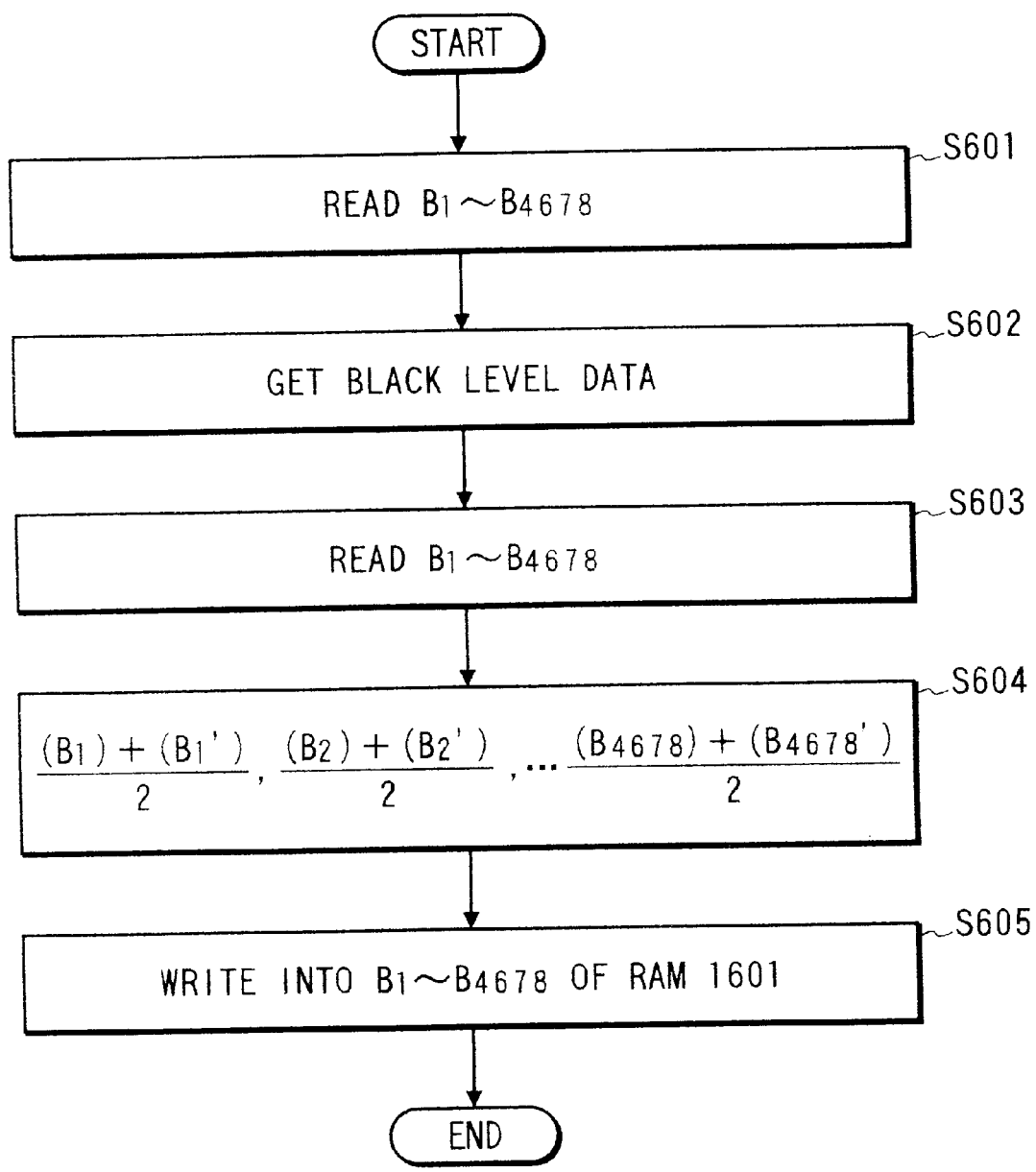
FIG. 17 is a flow chart showing the function of the embodiment of the present invention.

For this reason, the CPU 401 executes a process shown in a flow chart in FIG. 17, on the black level data fetched in the RAM 1601, thereby eliminating the influence of the noises.

At first, in a step S601, the CPU 401 sets data to the latch 1608 so as to close gates 1603, 1604, to open a gate 1609 and to select the port B of a selector 1606, thereby fetching the black level data stored in the addresses $B_1$ to $B_{4678}$ of the RAM 1601 into a work register of the CPU 401. The black level RAM 1601 is accessed by the addresses from an address bus of the CPU 401, and the black level data $B_1$–$B_{4678}$ are read through the work register and the data bus of the CPU 401.

A next step S602 effects reading of the black data into the RAM 1601 again. More specifically, the CPU 401 sets data to the latch 1608 so as to close the gate 1609, to open the gates 1603, 1604 and to select the port A of the selector 1606, whereby the RAM 1601 is accessed by the address counter 1605 and the black level data are written into the RAM 1601.

A step S603 reads the black level data ($B_1'$)–($B_{4678}'$) stored in the addresses $B_1$–$B_{4678}$ of the black level RAM 1601 and stores these data in the work register of the CPU 401 in a similar manner as in the step S602.

Then a step S604 adds, address by address, the black level data ($B_1$)–($B_{4678}$) and ($B_1'$)–($B_{4678}'$) fetched in the work register, then divides the result of addition with the number of data which is "2", and stores the result of the division into the work RAM. Then a step S605 sets data in the latch 1608 so as to close the gates 1603, 1609, to open the gate 1604 and to select the ports B of the selectors 1602, 1606, and writes again the data of the work RAM into the addresses $B_1$–$B_{4678}$ of the black level RAM 1601 through the selector 1602 and the gate 1604 and according to the address data from the CPU 401. By averaging the black level data in this manner, there can be obtained, in the RAM 1601, black level data without noise.

In the above-explained embodiment, the corrected black level data are obtained by averaging two different sets of the black level data, but the corrected data can be further improved in the precision, by increasing the number of sets of the data to be averaged.

Then, when a backward reading mode is set (direction indicated by broken-lined arrow in FIG. 8), the output of the B-linear image sensor 1302 is supplied to the black correction circuit 1502a.

Then the black level data are fetched in the same manner as in the case of R-image sensor 1301, but the RAM 1610 is selected by the data set by the CPU 401 in the latch 1608 and the process is executed according to the flow chart in FIG. 17, whereby the black level data are set in the RAM 1610.

After the fetching and the correction of the black level data as explained in the foregoing, there is executed the reading of the original image. At the reading of the original image, the CPU 401 sets data in the latch 1608 so as to close the gates 1604, 1609, to open the gate 1603 and to select the port A of the selector 1606, thereby setting the RAM 1601 or 1610 at the data readout mode, whereby the black level data of the black level RAM 1601 or 1610 are read, pixel by pixel according to the address data from the address counter 1605 and supplied through the gate 1603 into an input port B of a subtractor 1607, in synchronization with the input of image signals to the terminal $B_{in}$.

The black level RAM 1601 or 1610 is selected respectively in the forward reading or in the backward reading.

Consequently the output of the black correction circuit shown in FIG. 16 is, for the red (R) signal, is equal to $R_{in}(i)-DK(i)=R_{out}(i)$ for each pixel, wherein DK(i) is the black level data read from the black level RAM 1601 or 1610 and i indicates the pixel address (black correction mode). Similar control is conducted also on the green (G) and blue (B) signals, respectively by the black correction circuits 1502b, 1502c of a same configuration as shown in FIG. 16.

The color data subjected to such black level correction are respectively supplied to the white level correction (shading correction) units 1503a, 1503b, 1503c, in which correction is made on the fluctuation in the illuminating system, the optical system and the sensitivity of the sensor, based on the white color data obtained from the CCD sensors 1301, 1302, 1303 when a uniform white board 1818 is illuminated with the halogen lamp 1805.

Figure 18:
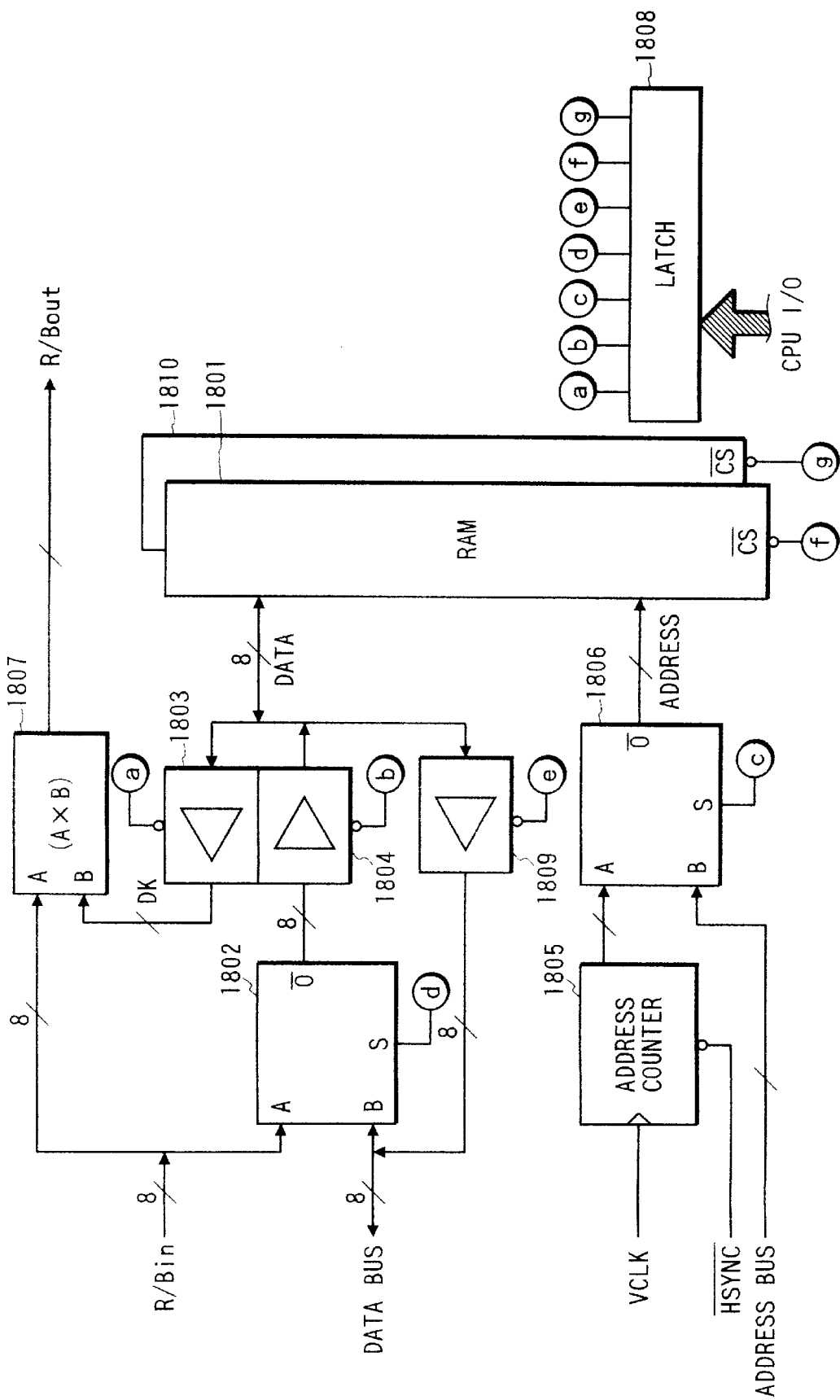
FIG. 18 is a block diagram of a white level correction circuit of the embodiment of the present invention.

FIG. 18 shows an example of the configuration of the white level correction circuit. The basic circuit configuration is same as that of the black correction circuit shown in FIG. 16, but the subtractor 1607 employed in the black correction explained above is replaced by a multiplier in the white level correction.

Figure 19:
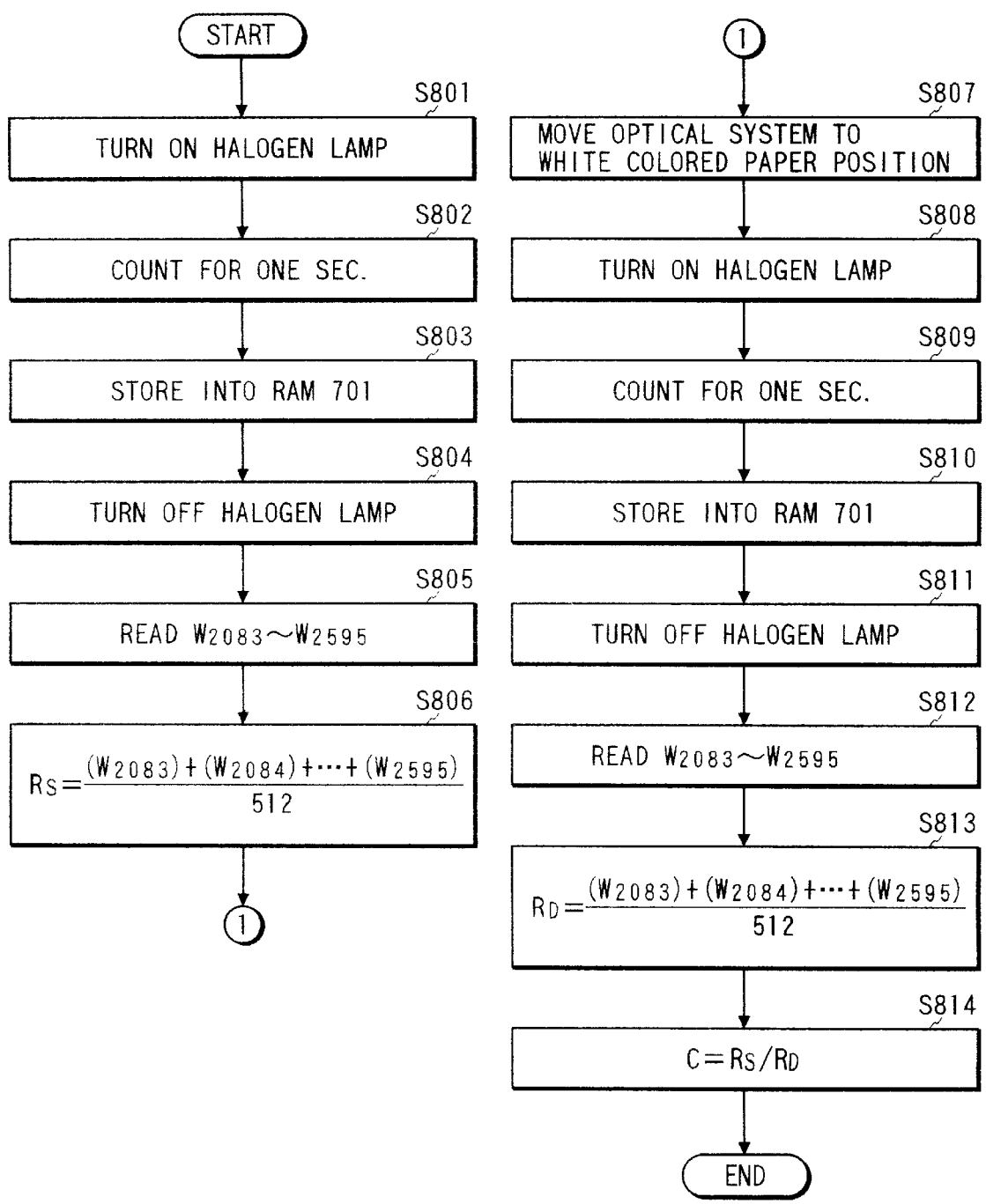

More specifically, in the present embodiment, in an initial value setting mode, a standard white sheet (for example a designated copying sheet) is placed on the platen glass 1800, then the read level $R_{D1}$ of the standard white sheet and the read level $R_S$ of the white board 1504 are measured by the CCD sensors, for each pixel, according to a flow chart shown in FIG. 19, and the measured data are stored in back-up memory of the CPU 401, which is not shown.

Then an actually used white sheet, for example a copying sheet is placed on the platen glass, and the read level $R_{D2}$ of this white sheet is measured by the CCD sensors, for each pixel, according to the flow chart in FIG. 19, and the measured data are stored in the back-up memory of the CPU 401.

As the white level correction units 1503a, 1503b, 1503c are mutually identical in the structure and function, the explanation in the following will be given on the unit 1503a only.

FIG. 19 is a flow chart showing an example of the procedure for determining the measured brightness of the white board.

As in the operation of the black level correction unit, the forward reading mode is set at first, and the output signal, already subjected to the black level correction, of the R-linear image sensor 1301 is supplied to the white level correction unit 1503a.

A step S801 turns on the halogen lamp 1805, and, in a step S802, the CPU 401 waits for 1 second to complete the start-up of the halogen lamp 1805.

A step S803 stores a line of the image data of the standard white board 1818, released from the CCD sensor 1301, in the correction RAM 1801 through the selector 1802 and the gate 1804.

A next step S804 turns off the halogen lamp 104, and, in a step S805, the CPU 401 temporarily stores the white image data $(R_{Si})=(W_i)$ (i=1–4678) of the standard white board, stored in the correction RAM 1801, into the working RAM through the gate 1809.

Then a step S806 determines the average of the output levels of 512 pixels around the central 2339th pixel, among the white image data $(R_{Si})=(W_i)$ (i=1–4678) of the standard white board stored in the working RAM, by:

$$R_S=\{(W_{2083})+(W_{2084})+\ldots+(W_{2595})\}/512$$

and stores the obtained result in the back-up RAM.

The read data $R_S$ of the standard white board may also be obtained, instead of averaging the output levels of the pixels around the central pixel, by determining a pixel having the peak value among all the image and averaging the output levels of the pixels around thus peak value pixel. In such case, the read data $R_{D1}$ of the standard white sheet and the read data $R_{D2}$ of the white sheet, to be determined afterwards, are measured in an image areas same as that used in determining the read data $R_S$.

Then a step S807 moves the mirror unit 1812 to a position below the standard white sheet placed on the platen glass 1810, and a step S808 again turns on the halogen lamp 1805.

Then a step S809 waits for 1 second counted by the CPU 401, and a step S810 again stores a line of the white image data of the standard white sheet, released from the CCD sensor 1301, in the correction RAM 1801 through the selector 1802 and the gate 1804.

A step S811 turns off the halogen lamp 1805, and a step S812 stores the white image data $(W_1)$–$(W_{4678})$ of the addresses $W_1$–$W_{4678}$ of the correction RAM 1801 into the working RAM.

Then a step S812 calculates the average $R_{D1}$ of the output levels of the 2083rd to 2595th pixels, among the white image data $(W_1)$–$(W_{4678})$ of the standard white sheet stored in the working RAM, by:

$$R_{D1}=\{(W_{2083})+(W_{2084})+\ldots+(W_{2595})\}/512$$

and stores the obtained result in the back-up RAM.

A next step S814 determines the measured brightness of the white board from the image data $R_D$ of the white sheet and the image data $R_S$ of the standard white board, both stored in the working RAM, by:

$$C=R_S/R_D$$

and stores the obtained result in the working RAM.

The measured output of the white sheet is taken as N (=typ255), and the white board is so-called gray color, with a reflection density lower than that of the white sheet. However, it is extremely difficult to produce completely gray color, and the white board often bears certain color or is somewhat discolored. If the white correction is made with such white board, the gray balance of the read image data becomes perturbed. It is however possible to correct such gray balance by assuming a perturbation in the output balance of the R, G, B CCD sensors in reading the white board and setting a white board brightness correction factor K (=typ1) for each color as the coefficient for correcting such perturbation in the balance. Thus an assumed output value N of the white sheet and the white board brightness correction factors K are also stored in the working RAM, together with the measured value C of the brightness of the white board.

Then, as in the operation of the black level correction unit, a backward reading mode is set, and the output, already subjected to black level correction, of the B-linear image sensor 1302 is supplied to the white level correction unit 1503a. Then, in the same manner as in the forward reading mode, there are determined the image data $R_D'$ of the white sheet, the image data $R_S'$ of the standard white board, the measured brightness C' of the white board and the white board brightness correction factor K' and stored in the working RAM.

In the actual correcting operation, at first in the forward reading operation, the lamp 1805 is turned on to illuminate the white board 1818 prior to the copying or reading operation, and a line of the white image data of uniform white level, output from the CCD sensors, are stored in the correction RAM 1801 through the selector 1802 and the gate 1804.

Then the correction coefficients for each pixel are calculated according to a flow chart shown in FIG. 20.

In a step S1001, the CPU 401 sets data in the latch 1808 so as to close the gates 1803, 1804, to open the gate 1809 and to select the port B of the selector 1806, in order to fetch the white image data, stored in the addresses $W_1$–$W_{4678}$ of the correction RAM 1801, into the working register of the CPU 401.

Thus the correction RAM 1801 is accessed by the addresses from the address bus of the CPU 401, and the white image data $(W_1)$–$(W_{4678})$ are fetched in the work register of the CPU 401 through the gate 1809 and the data bus.

Then a step S1002 calculates, for each pixel of the white image data $(W_1)$–$(W_{4678})$ in the address $W_1$–$W_{4678}$ of the work register, a shading correction coefficient $E_i$ from the assumed output N of the white sheet, the white board brightness correction factor K and the measured brightness C of the white board, stored in the working RAM, by:

$$E_i=(N\times C\times K)/W_i (i=1–4678).$$

Then a step S1003 sets data in the latch 1808 so as to close the gates 1803, 1809, to open the gate 1804 and to select the ports B of the selectors 1802, 1806, thereby again writing the data of the working RAM in the addresses $W_1$–$W_{4678}$ of the correction RAM 1801 through the selector 1802 and the gate 1804 and according to the address data from the CPU 401.

At the reading of the original image, the correction coefficients $E_i$ are supplied from the correction RAM 1801 to the multiplier 1807 through the gate 1803, in synchronization with the input image data $D_i$ entered into the terminal $B_{in}$ whereby a calculation:

$$D_o = D_i \times E_i$$

is executed for each pixel to obtain corrected data.

Also in the backward reading, similar correction is made by selecting the correction RAM 1802.

As explained in the foregoing, the present embodiment effects appropriate shading correction on the output signal regardless of the image reading direction or the charge integrating direction, thereby providing stable output signals.

What is claimed is:

1. An image reading apparatus comprising:
   a) plural sensors for converting light from an object into image signals;
   b) charge transfer means for transferring the image signals generated respectively in adjacent ones of the plural sensors, therebetween;
   c) correction means for correcting signal levels of said image signals; and
   d) control means for controlling said correction means so as to vary a correction condition of said correction means, according to a direction of transfer of said image signals by said charge transfer means among said sensors.

2. An image reading apparatus according to claim 1, wherein said correction means corrects a peak level and/or a bottom level of said image signals.

3. An image reading apparatus according to claim 2, wherein said correction means is operable to correct a black level of said image signals.

4. An image reading apparatus according to claim 2, wherein said correction means is operable to correct a white level of said image signals.

5. An image reading apparatus according to claim 1, wherein said sensors are line sensors.

6. An image reading apparatus according to claim 5, where said correction means is operable to effect correction on said read image signals, by effecting a predetermined operation on said image signals.

7. An image reading apparatus according to claim 5, wherein said charge transfer means is provided in at least three units, which are positioned among said line sensors.

8. An image reading apparatus according to claim 5, further comprising plural shift registers positioned among said plural line sensors, wherein each of said shift registers is commonly used by the line sensors positioned on either side of each said shift register.

9. An image reading apparatus according to claim 8, wherein said shift registers are positioned on both sides of each of said plural line sensors.

10. An image reading apparatus provided, on a single wafer, with a plurality of linear image sensors, each of which includes plural line sensors for converting light from an object into image signals, plural shift registers for transferring the image signals converted by said line sensors to an output unit, and color filters formed on said line sensors for effecting color separation of the light from the object, said image reading apparatus comprising:
    a) first plural charge transfer means provided between adjacent ones of said plural line sensors for transferring the image signal generated respectively in the adjacent line sensors, therebetween to synthesize the image signals;
    b) second plural charge transfer means provided among said plural shift registers and adapted for transferring the charges among said plural shift registers;
    c) correction means for correcting signal levels of said image signals; and
    d) control means for switching a direction of transfer by said first and second charge transfer means in a forward or backward direction by varying a timing of a driving pulse for said first charge transfer means, and varying a correction condition of said correction means according to said direction of transfer.

11. An image reading apparatus according to claim 10, wherein said linear image sensors are of the time delay and integration system.

12. An image reading apparatus according to claim 10, wherein said correction means corrects a peak level and/or a bottom level of said image signals.

13. An image reading apparatus according to claim 12, wherein said correction means is operable to correct a black level of said image signals.

14. An image reading apparatus according to claim 12, wherein said correction means is operable to correct a white level of said image signals.

15. An image reading apparatus according to claim 10, wherein said first charge transfer means is provided in at least three units, which are positioned among said line sensors.

16. An image reading apparatus according to claim 10, wherein said second charge transfer means is provided in at least three units, which are positioned among said shift registers.

17. An image reading apparatus according to claim 10, wherein said plural shift registers are positioned among said plural line sensors, and wherein each of said shift registers is commonly used by the line sensors positioned on either side of each said shift register.

18. An image reading apparatus according to claim 17, wherein shift registers are positioned on both sides of each of said plural line sensors.

19. An image reading apparatus comprising:
    a) plural sensors for converting light from an object into image signals;
    b) correction means for correcting signal levels of said image signals; and
    c) control means for controlling said correction means so as to vary a correction condition of said correction means, according to a relative direction of movement between said sensors and the object.

20. An image reading apparatus according to claim 19, wherein said correction means is operable to effect correction on said read image signals, by effecting a predetermined operation on said image signals.

21. An image reading apparatus according to claim 19, wherein said sensors are line sensors.

22. An image reading apparatus according to claim 21, wherein said correction means is operable to effect correction on said image signals, by effecting a predetermined operation on said image signals.

23. An image reading apparatus according to claim 21, wherein charge transfer means is provided in at least three units, positioned among said line sensors.

24. An image reading apparatus according to claim 21, further comprising plural shift registers positioned among said plural line sensors, wherein each of said shift registers is commonly used by the line sensors positioned on either side of each said shift register.

25. An image reading apparatus according to claim 24, wherein said shift registers are positioned on both sides of each of said plural line sensors.

26. An image reading apparatus according to claim 19, wherein said correction means corrects a peak level and/or a bottom level of said image signals.

* * * * *

UNITED STATES PATENT AND TRADEMARK OFFICE
CERTIFICATE OF CORRECTION

PATENT NO. : 5,917,620

DATED : June 29, 1999

INVENTOR(S) : SHIZUO HASEGAWA ET AL.

It is certified that error appears in the above-identified patent and that said Letters Patent is hereby corrected as shown below:

COLUMN 2

Line 52, "causing" should read --cause--.

COLUMN 4

Line 9, "case" should read --the case of--.

COLUMN 6

Line 15, "gate s" should read --gates--.

COLUMN 8

Line 30, "A" should read --¶ A--.

COLUMN 9

Line 35, "VCA 101c," should read --VCA's 101c,--.

COLUMN 12

Line 30, "subtractor 1607," should read --subtracter 1607,--;
Line 35, "FIG. 16 is," should read --FIG. 16,--; and
Line 54, "subtractor 1607" should read --subtracter 1607--.

COLUMN 13

Line 23, "lamp 104," should read --lamp 1805,--; and
Line 40, "thus" should read --this--.

UNITED STATES PATENT AND TRADEMARK OFFICE
CERTIFICATE OF CORRECTION

PATENT NO. : 5,917,620

DATED : June 29, 1999

INVENTOR(S) : SHIZUO HASEGAWA ET AL.

It is certified that error appears in the above-identified patent and that said Letters Patent is hereby corrected as shown below:

COLUMN 15

Line 37, "where" should read --wherein--.

Signed and Sealed this

Sixteenth Day of May, 2000

Attest:

Q. TODD DICKINSON

Attesting Officer

Director of Patents and Trademarks